United States Patent
Engh-Halstvedt et al.

(10) Patent No.: US 10,650,580 B2
(45) Date of Patent: May 12, 2020

(54) GRAPHICS PROCESSING

(71) Applicant: Arm Limited, Cambridge (GB)

(72) Inventors: Andreas Due Engh-Halstvedt, Trondheim (NO); Frank Klaeboe Langtind, Melhus (NO)

(73) Assignee: Arm Limited, Cambridge (GB)

( * ) Notice: Subject to any disclaimer, the term of this patent is extended or adjusted under 35 U.S.C. 154(b) by 9 days.

(21) Appl. No.: 16/026,402

(22) Filed: Jul. 3, 2018

(65) Prior Publication Data

US 2019/0012829 A1 Jan. 10, 2019

(30) Foreign Application Priority Data

Jul. 6, 2017 (GB) .................................... 1710873.9

(51) Int. Cl.
| | |
|---|---|
| *G06T 15/80* | (2011.01) |
| *G06T 1/60* | (2006.01) |
| *G06T 15/00* | (2011.01) |
| *G06T 1/20* | (2006.01) |

(52) U.S. Cl.
CPC ................ *G06T 15/80* (2013.01); *G06T 1/20* (2013.01); *G06T 1/60* (2013.01); *G06T 15/005* (2013.01); *G06T 2200/28* (2013.01)

(58) Field of Classification Search
None
See application file for complete search history.

(56) References Cited

U.S. PATENT DOCUMENTS

| | | | |
|---|---|---|---|
| 2003/0016217 A1* | 1/2003 | Vlachos | ................ G06T 17/20 345/423 |
| 2007/0146378 A1 | 6/2007 | Sorgard | |
| 2009/0073177 A1 | 3/2009 | Jiao | |
| 2010/0302246 A1 | 12/2010 | Jiao | |

(Continued)

FOREIGN PATENT DOCUMENTS

| | | |
|---|---|---|
| CN | 106504183 | 3/2017 |
| GB | 2527822 | 1/2016 |

OTHER PUBLICATIONS

Combined Search and Examination Report dated Nov. 28, 2017, GB Patent Application GB1710873.9.

(Continued)

*Primary Examiner* — Frank S Chen
(74) *Attorney, Agent, or Firm* — Vierra Magen Marcus LLP

(57) ABSTRACT

A graphics processing pipeline includes: a position shader, a tiler, a pool of memory for storing primitive lists and vertex shaded attributes data for vertices, a varying-only vertex shader, and a fragment frontend and shader. The position shader performs vertex shading for the positional attributes of the vertices of a set of vertices to be processed by the graphics processing pipeline. The tiler uses the vertex shaded position data to identify primitives that should be processed further to generate the render output. When the tiler determines that a vertex should be processed further to generate the render output, it allocates memory space in the memory pool for storing vertex shaded attributes data for the vertex. Vertex shaded attributes data for the vertex is then stored in the allocated space in the memory pool for later use, e.g., by the fragment frontend and shader.

21 Claims, 7 Drawing Sheets

(56) References Cited

U.S. PATENT DOCUMENTS

2012/0005557 A1* 1/2012 Mardiks ................ G06F 11/10
714/763
2014/0089624 A1* 3/2014 Ffrench ................ G06F 9/5016
711/170
2017/0193691 A1 7/2017 Langtind
2018/0025463 A1* 1/2018 Kazakov ............... G06T 15/005
345/522

OTHER PUBLICATIONS

Office Action dated Mar. 22, 2018, U.S. Appl. No. 15/393,120.
Response to Office Action dated Sep. 19, 2018, U.S. Appl. No. 15/393,120.
Notice of Allowance dated Nov. 21, 2018, U.S. Appl. No. 15/393,120.
GB Combined Search and Examination Report, dated Mar. 22, 2016, GB Patent Application No. GB1600144.8.

* cited by examiner

GRAPHICS PROCESSING

BACKGROUND

The technology described herein relates to graphics processing, and in particular to the operation of graphics processing pipelines that perform vertex shading.

Graphics processing is normally carried out by first splitting a scene (e.g. a 3-D model) to be displayed into a number of similar basic components or "primitives", which primitives are then subjected to the desired graphics processing operations. The graphics "primitives" are usually in the form of simple polygons, such as triangles.

Each primitive is usually defined by and represented as a set of vertices, where each vertex typically has associated with it a set of "attributes", i.e. a set of data values for the vertex. These attributes will typically include position data and other, non-position data (varyings), e.g. defining colour, light, normal, texture coordinates, etc, for the vertex in question.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and a set of primitives that use those vertices.

Once primitives and their vertices have been generated and defined, they can be processed by the graphics processing system, in order to generate the desired graphics processing output (render target), such as a frame for display. This basically involves rasterising and rendering the primitives to generate the graphics processing output.

The rasterising and rendering processes use the vertex attributes associated with the vertices of the primitives that are being processed. To facilitate this operation, the attributes of the vertices defined for the given graphics processing output (e.g. draw call) are usually subjected to an initial so-called "vertex shading" operation, before the primitives are rasterised and rendered. This "vertex shading" operation operates to transform the attributes for each vertex into a desired form for the subsequent graphics processing operations. This may comprise, for example, transforming vertex position attributes from the world or user space that they are initially defined for to the screen space that the output of the graphics processing system is to be displayed in.

A graphics processing pipeline will typically therefore include a vertex shading stage (a vertex shader) that executes vertex shading computations on the initial vertex attribute values defined for the vertices so as to generate a desired set of output vertex attributes (i.e. appropriately "shaded" attributes) for use in subsequent processing stages of the graphics processing pipeline.

Once the vertex attributes have been shaded, the "shaded" attributes are then used when processing the vertices (and the primitives to which they relate) in the remainder of the graphics processing pipeline.

(In general "input variables" and "output variables" are the generic terms used for inputs and outputs from shaders (shading stages) in graphics processing pipelines. Before being vertex shaded, a vertex is a collection of "generic vertex attributes" that can be accessed within the vertex shader as input variables. The vertex shader execution then produces a vertex position and any outputs explicitly written by the vertex shader. "Varyings" are the attributes communicated from the vertex shader to rasterisation and fragment shading, not including position. (Thus only the non-position outputs from the vertex shader are "varyings".))

One form of graphics processing pipeline is a so called tile-based graphics processing pipeline, wherein the two-dimensional render output or target is rendered as a plurality of smaller area sub-regions, usually referred to as "tiles". The tiles are each rendered separately (typically one after another). The rendered tiles are then combined to provide the complete rendering output (e.g. frame for display).

(Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques.)

In a tile-based graphics processing pipeline, the geometry (primitives) for the render output being generated is sorted into the tiles that the rendering process operates on. The tiling process identifies primitives that need to be processed for a given rendering tile (so as to, e.g., avoid unnecessarily rendering primitives that are not actually present in a tile). The tiling process produces lists of primitives to be rendered for the rendering tiles. Then, once the primitive lists have been prepared for the rendering tiles, each rendering tile is processed, by rasterising and rendering the primitives listed for the rendering tile.

An important aspect of tile-based graphics processing therefore is the initial processing to generate the primitive lists for use to identify the primitives that need to be processed for the rendering tiles, which initial processing is then followed by the main rasterising and rendering passes for the tiles.

Thus, in a tile-based processing system there will be an initial processing pass which, in effect, sorts the graphics primitives (and/or other graphics entities) to be processed into the tiles that the render output is divided into for processing purposes. This initial processing pass must be performed for all the geometry (primitives), etc., for the render output unit of processing (e.g. draw call) to be processed (as it is only once all the geometry has been sorted into the "tiles" that all the geometry that needs to be processed for a given tile will be known). The rasterising and rendering of the geometry (primitives) in the tiles to generate the render output can accordingly only be done once the initial processing to sort the geometry, etc. into the tiles has been completed, and so, is, in effect, "deferred" until the initial processing of the geometry (primitives) to sort it into the tiles has been completed.

Tile-based graphics processing pipelines can accordingly be thought of as (and referred to as) "deferred" graphics processing pipelines (graphics processors) (and to perform "deferred" rendering). This is because the rasterising and rendering pass is deferred until suitable lists of primitives to be processed have been prepared for each tile that the render output has been divided into for processing purposes.

The Applicants have recognised that when performing deferred rendering as in the case of a tile-based graphics processing pipeline, it is desirable to retain (store) geometry data (and in particular vertex-shaded vertex data) that has been used for the initial "tiling" processing pass for use in the later deferred rasterising and rendering pass. This can then avoid, e.g., having to re-generate the vertex-shaded vertex data (to "re-shade" vertices) between the initial "tiling" processing pass and the later deferred rasterising and rendering pass.

However, this then means that there is a need to store geometry (and in particular vertex) data for a period of time for use in the later, deferred, rasterising and rendering pass. Accordingly, memory needs to be allocated to store this data so that it is available for the later deferred rasterising and rendering pass.

One way to do this would simply be to allocate the maximum amount of memory space that could possibly be required for all of the geometry (vertex) data (potentially) to be processed (e.g. based on the total number of vertices input by the application that requires the graphics processing). However, this can be inefficient in terms of the overall usage of memory in the data processing system that the graphics processing pipeline is part of (or, indeed, there may not be sufficient available memory space to set aside for all of the (potentially) required data). It can also be a relatively complex task to determine how much memory space should be allocated.

It would also be possible to use more complex analysis of the likely memory storage requirements so as to try to achieve more efficient allocation of memory for this purpose, but this can lead to increased driver complexity and operations (and/or may require some or all of the "memory allocation" operations to be performed on the graphics processor itself).

The Applicants accordingly believe that there remains scope for improvements to, in particular tile-based, graphics processing pipelines that employ vertex shading.

BRIEF DESCRIPTION OF THE DRAWINGS

Embodiments of the technology described herein will now be described by way of example only and with reference to the accompanying drawings, in which.

Like reference numerals are used for like components in the Figures, where appropriate.

DETAILED DESCRIPTION

Figure 1:
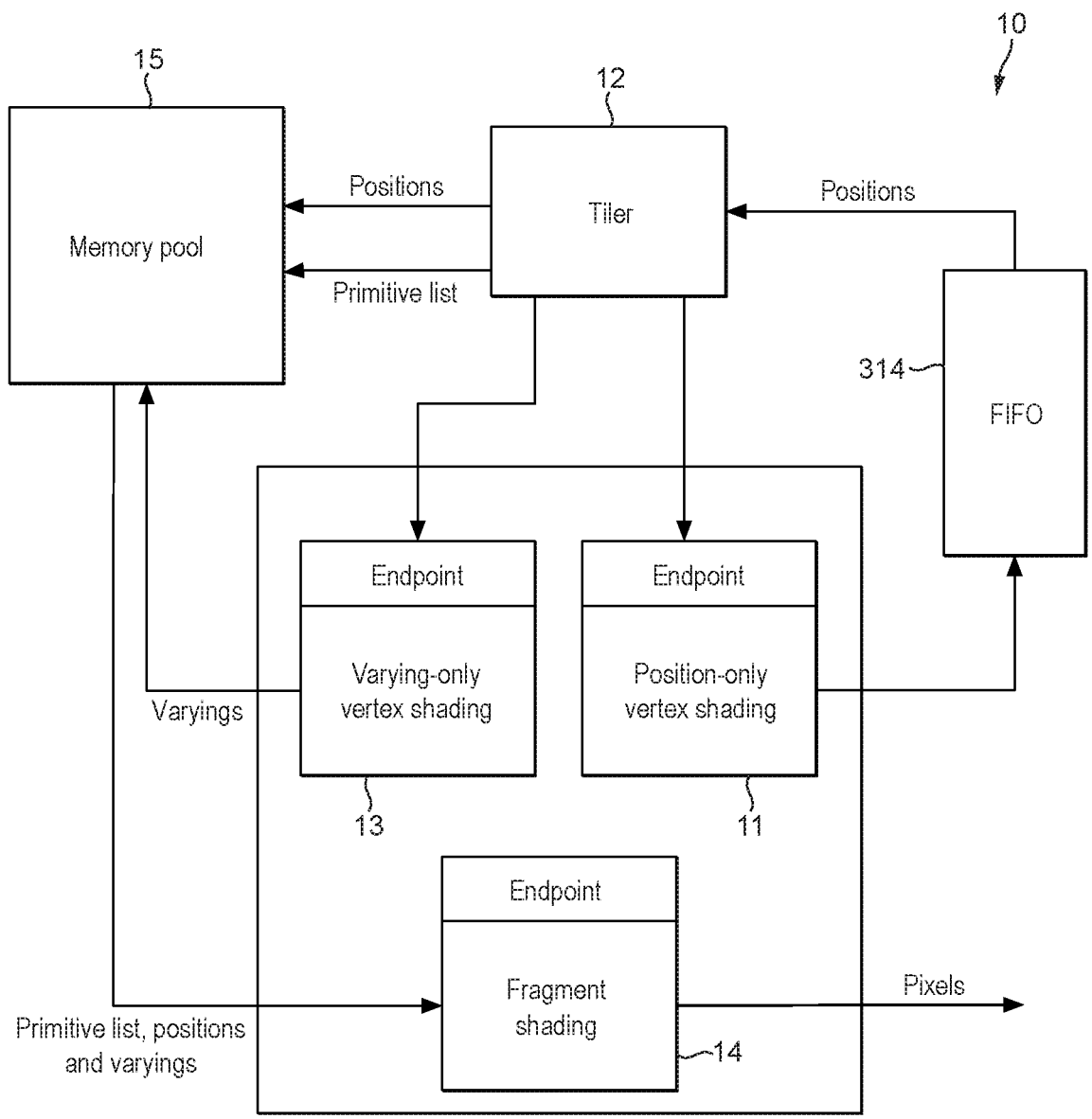
FIG. 1 shows schematically a graphics processing pipeline according to an embodiment of the technology described herein.

A first embodiment of the technology described herein comprises a method of operating a graphics processing pipeline, the method comprising:

for a set of vertices to be processed by the graphics processing pipeline:
a vertex shading stage of the graphics processing pipeline performing a first vertex shading operation on one or more vertices of the set of vertices, to generate vertex shaded attribute data for at least one vertex attribute of the one or more vertices of the set;

a testing stage of the graphics processing pipeline determining, for respective vertices or groups of vertices of the one or more vertices that have been subjected to the first vertex shading operation, whether or not memory space should be allocated for storing vertex shaded attribute data for at least one vertex attribute for the vertex or group of vertices, wherein the determining comprises using, at least in part, some or all of the vertex shaded attribute data generated by the first vertex shading operation;

the testing stage, in response to determining that memory space should be allocated for a vertex or group of vertices, sending a request for memory space to be allocated for the vertex or group of vertices; and in response to the request from the testing stage, a memory allocator allocating memory space for storing vertex shaded attribute data for the vertex or group of vertices for which the request has been sent.

A second embodiment of the technology described herein comprises a graphics processing system, comprising:

a graphics processing pipeline comprising:
a vertex shading circuit operable to perform a first vertex shading operation on one or more vertices of a set of vertices to be processed by the graphics processing pipeline, to generate vertex shaded attribute data for at least one vertex attribute of the one or more vertices of the set; and a testing circuit operable to determine, for respective vertices or groups of vertices of the one or more vertices that have been subjected to the first vertex shading operation, whether or not memory space should be allocated for storing vertex shaded attribute data for at least one vertex attribute for the vertex or group of vertices, wherein the determining comprises using, at least in part, some or all of the vertex shaded attribute data generated by the first vertex shading operation;

the testing circuit being further operable to, in response to determining that memory space should be allocated for a vertex or group of vertices, send a request for memory space to be allocated for the vertex or group of vertices;

the graphics processing system further comprising:
a memory allocator operable to, in response to a request from the testing circuit for memory space to be allocated, allocate memory space for storing vertex shaded attribute data for a vertex or group of vertices for which the request has been sent.

In the technology described herein, unlike in conventional deferred rendering graphics processing arrangements, memory space for storing vertex shaded attribute data for a vertex or group of vertices is allocated after a testing operation that uses vertex shaded data from a first vertex shading operation has determined that memory space should be allocated for the vertex or group of vertices. In other words, the memory space allocation for the vertex shaded attribute data for the vertex or group of vertices is allocated, in effect, conditionally, and "on demand", in dependence upon the result of the testing stage (which uses vertex shaded data generated by a first vertex shading operation).

The Applicants have recognised in this regard that in many cases not all the vertices defined for an, e.g. draw call, will in fact be used to generate the desired graphics output, e.g. frame for display. This may occur, e.g., when one or more vertices lie outside of the view frustum or when one or more vertices belong (solely) to back-facing primitives. The Applicants have further recognised that any memory space allocation for vertex shaded attribute data of such "unused" vertices is, in fact, unnecessary (and furthermore, would be desirable to be avoided, if possible).

The technology described herein addresses and facilitates this by providing a system that can reduce or avoid the redundant allocation of memory space for vertex shaded attribute data. This is achieved, as mentioned above, by allocating memory space for vertex shaded attribute data for vertices (only) after it has been determined by a testing stage that uses vertex shaded attribute data for the vertices whether the memory space should be allocated. In this way, and as will be discussed further below, only a reduced amount of memory space for storing vertex shaded attribute data can be (and needs to be) allocated, and, in particular, the allocation of memory space for storing vertex shaded attribute data for vertices that will in fact be "unused" can be reduced and/or avoided. This therefore facilitates the more efficient use of memory for storing vertex data (and in particular vertex shaded attribute data for vertices) in deferred (e.g. tile-based) rendering systems.

The set of vertices that is being processed in the arrangements of the technology described herein can be any desired and suitable set of vertices to be processed by the graphics processing pipeline. Thus the set of vertices may comprise (and in one embodiment does comprise) the entire set of vertices defined for a given graphics processing output (render target), such as for a frame to be displayed. It may also comprise a set of vertices that is defined for less than the entire render output, such as a set of vertices defined for a given draw call. In an embodiment, the set of vertices is a set of vertices defined for a draw call.

(Where the set of vertices is less than the entire set of vertices defined for a given render output, then in an embodiment the operation in the manner of the technology described herein is repeated for each set of vertices (e.g., and in an embodiment, each draw call) of the render output. Correspondingly, the process of the technology described herein is in an embodiment repeated for plural, and in an embodiment for each, render output to be generated, e.g. for successive frames in a sequence of output frames.)

The first vertex shading operation that processes (vertex shades) one or more vertices of the set of vertices may process only some but not all of the vertices of the set of vertices, but in an embodiment processes all of the vertices of the set of vertices being processed (i.e. each vertex in the set of vertices being processed is subjected to the first vertex shading operation).

The first vertex shading operation could perform vertex shading for all of the vertex attributes of the vertices but in an embodiment performs vertex shading for at least one but not all of the vertex attributes of the vertices (i.e. for some but not all of a plurality of vertex attributes of the one or more vertices of the set).

The at least one vertex attribute that is processed in the first vertex shading operation can be any one or more desired and suitable vertex attribute(s). There may be only one attribute that is processed, or there may be plural attributes that are processed.

In an embodiment, the attribute(s) that is processed in the first shading operation is an attribute(s) that one or more conditions that must be met if memory space is to be allocated to a vertex is or are dependent on.

In an embodiment, the vertex attribute(s) that are processed in the first vertex shading operation comprise one or more position attributes of the vertices. Usually there will only be a single position attribute, consisting of (X, Y, Z, W) components. In this case, the vertex attributes that are processed in the first vertex shading operation will comprise (at least) that single position attribute. However, there may also be other position attributes, such as a point size or a line width (e.g. when rendering points and lines).

In an embodiment all the position attributes are vertex shaded in the first vertex shading operation, but less than all, such as only one of the position attributes could be processed, if desired. In one embodiment, only position attributes are processed in the first vertex shading operation (and thus in an embodiment no varyings are processed in the first vertex shading operation), but it would also be possible to process one or more other (non-position) attributes as well as one or more position attributes, if desired.

In embodiments of the technology described herein, the first vertex shading operation comprises performing vertex shading computations on the position attributes (position data) of the vertices of the set being processed. Thus, the first vertex shading operation in an embodiment transforms at least, and in an embodiment only, the position attributes of the vertices being processed.

The vertex shaded attribute data that is generated by the first vertex shading operation can comprise any desired and suitable such data, and will, e.g., depend upon the vertex attributes that the first vertex shading operation processes. As discussed above, the vertex shaded data generated by the first vertex shading operation in an embodiment comprises (at least) vertex shaded position data (e.g. the transformed geometry) for the vertices. The vertex shaded data may also comprise vertex shaded data for one or more of the non-position vertex attributes.

The vertex shaded attribute data that is generated by the first vertex shading operation should be, and is in an embodiment, stored appropriately for use by the testing stage of the graphics processing pipeline. In an embodiment, a FIFO is used to transfer vertex shaded data from the first vertex shading operation to the testing stage.

It is then determined for respective vertices or groups of vertices of the one or more of the vertices that have been subjected to the first vertex shading operation whether memory space for storing vertex shaded attribute data for that vertex (or group of vertices) should be allocated (or not). This can be done once the first vertex shading operation has been completed for all the vertices of the set in question (once all the vertices to be subjected to the first vertex shading operation have been processed). However, the determination is in an embodiment performed for a vertex (or group of vertices) as soon as the vertex (or group of vertices) has been processed in the first vertex shading operation. This facilitates for example, reuse of any already cached vertex data that has been cached for the first vertex shading operation.

Thus, in an embodiment, the determination of whether memory space should be allocated for a vertex or a group of vertices is performed once the first vertex shading operation has been completed for that vertex or group of vertices, and without waiting for the first vertex shading operation to be completed for all (and, in an embodiment, for other and in an embodiment for any other) of the vertices in the set of vertices being processed.

The determination is in an embodiment done for all the vertices that have been subjected to the first vertex shading operation (although this is not essential, and if desired only some but not all of the vertices that have been subjected to the first vertex shading operation could be subjected to this determination).

The determination of whether memory space should be allocated for a vertex (or group of vertices) following the first vertex shading operation can be performed in any desired and suitable manner and using any desired and suitable test to determine if memory space should be allocated for the vertex (or group of vertices).

In an embodiment, this process determines whether the vertex (or group of vertices) could be required for generating the output of the overall graphics processing operation in question (i.e. whether the vertex could be needed to contribute to the render output (e.g. frame) of the graphics processing operation).

The determination is in an embodiment carried out in an appropriately conservative manner, so as to only not allocate memory space for vertices that it can be determined with sufficient certainty will not be required for generating the output of the graphics processing operation.

In an embodiment, this determination comprises determining whether the vertex belongs to (is to be used for) a primitive that could be visible in the output of the graphics processing operation (and if it is determined that the vertex (or group of vertices) does not belong to (is not used for) any primitives that could be visible in the output of the graphics processing operation, then the vertex (or group of vertices) is determined as not being required for generating the output of the graphics processing operation (and so should not have (and in an embodiment does not have) any memory space allocated to it).

Thus, in an embodiment, the testing stage determines for respective primitives for the graphics processing output being generated, whether memory space should be allocated for storing vertex shaded attribute data for the vertices of the primitive. Correspondingly, the testing stage in an embodiment determines for a (and in an embodiment for plural, and in an embodiment for each) group of one or more vertices comprising the vertices of a given primitive defined for the set of vertices, whether or not memory space should be allocated for storing vertex shaded attribute data for that group of vertices (primitive). Correspondingly, each group of vertices for which it is determined whether memory space should be allocated for storing vertex shaded attribute data in an embodiment comprises a group of vertices corresponding to a (respective) primitive to be rendered.

In an embodiment, a vertex (or group of vertices) is determined as being required for generating the output of the graphics processing operation if the vertex (or group of vertices): belongs to a primitive that lies at least partially within the view frustum for the output being generated and/or belongs to a forward facing primitive. In an embodiment, if a vertex (or group of vertices) is determined to belong to a forward facing primitive that lies at least partially within the view frustum, it is determined as being required for generating the output of the graphics processing operation (and memory space is allocated for storing vertex shaded attribute data for the vertex (or group of vertices)). Correspondingly, any vertex that solely belongs to primitives that lie entirely outside the view frustum or that are backward facing is in an embodiment determined as not being required (and so, in an embodiment, does not have any memory space allocated for it).

The determination of whether memory space should be allocated for a vertex (or group of vertices) uses, as discussed above, at least in part, vertex shaded data from the first vertex shading operation. As discussed above, this vertex shaded data will depend upon the nature of the determination, but in an embodiment comprises vertex shaded position data (attributes) for the vertices in question (as it is the position data for the vertices (and for the primitives that they form) that is needed, for example, to determine whether vertices and primitives lie within the view frustum and/or are backward facing (or not)).

The testing stage that determines whether memory space should be allocated for a vertex (or group of vertices) following the first vertex shading operation can be any desired and suitable stage and element of the graphics processing pipeline. For example, a specific testing stage for performing this determination could be included in the graphics processing pipeline.

However, in an embodiment, the determination is performed by an existing (processing) stage of the graphics processing pipeline, in an embodiment by a stage that would otherwise normally perform as part of its "normal" processing operations a test or tests that can be used for the determination.

Thus, in an embodiment, the testing stage of the graphics processing pipeline that determines whether memory space should be allocated for a vertex or group of vertices comprises a stage of the graphics processing pipeline that performs another processing operation or operations for the graphics processing pipeline, in addition to the test or tests that are used for the determination (and/or for which processing stage the test or tests that can be used for the determination are part of its overall processing operations, but the stage performs other processing operations as well).

In an embodiment, the graphics processing pipeline is a tile based graphics processing pipeline, and the tiler (the tiling stage) of the graphics processing pipeline (i.e. the stage of the graphics processing pipeline that sorts the primitives into respective regions of the render output and prepares appropriate lists of primitives for processing for each such region of the render output (e.g. frame)) performs the determination of whether memory space should be allocated for the vertices. Thus, in an embodiment, the testing stage is a tiler of the graphics processing pipeline.

Typically, the tiler will determine (from the vertex shaded position attributes for the vertices) which primitives are potentially visible in the render target being generated, and thus should, e.g., be allocated memory space for their vertices. For example, the tiling process will normally test whether primitives are (at least partially) within the view frustum and are therefore required for generating the output of the graphics processing operation. The tiler will also typically include a backward facing culling test.

Thus, the tiler is a stage of the graphics processing pipeline for performing the determination, as the tiler already operates to perform "visibility" tests (such as view frustum and/or back facing tests and so on) on primitives of the scene to be displayed.

Thus, if a primitive is included in a tile list by the tiler (the tiling process), that can be taken as an indication that (and a determination that) the primitive (and thus its vertices) could be required for generating the output of the graphics processing operation.

Thus, in an embodiment, a vertex (or group of vertices) is allocated memory space for its vertex shaded attributes data if it is determined to belong to a potentially visible primitive at the tiling stage, and in an embodiment if (when) a primitive that it belongs to (that it is to be used for) is included in a primitive list at the tiling stage.

Correspondingly, in an embodiment, the determining of whether a vertex should be allocated memory space comprises determining whether the vertex belongs to (is to be used for) a primitive that has been included in a primitive list for the graphics processing operation being performed.

The tiler (and the testing stage, if not the tiler) can use any suitable and desired methods to determine which vertices should be allocated memory space, such as tests on the vertices (or on the primitives to which the vertices belong) based on bounding boxes, back facing determinations, or any other suitable tests that can, e.g. be performed in a tiler (at the tiling stage).

In an embodiment, the determination of whether or not memory space should be allocated for storing vertex shaded attribute data for a vertex or group of vertices further comprises, in addition to the, e.g. "visibility" test discussed above, also determining whether memory space has already been allocated for vertex shaded attributes data for a vertex.

Thus, in an embodiment, before allocating memory space for a vertex that it has been determined will be, e.g., "visible" (whether as a single vertex or as part of a group of vertices), it is determined whether memory space has already been allocated for vertex shaded attributes data for that vertex.

The Applicants have recognised in this regard that memory space could already have been allocated for vertex shaded attributes data for a vertex, for example if a vertex was part of an earlier group of vertices for which memory space has already been allocated. This could be the case where, for example, a vertex has already been used by a visible primitive. In that case, memory space will already have been allocated for the vertex, and so there is no need to allocate memory space for that vertex again.

Thus, in an embodiment, the determination of whether or not a memory space should be allocated for storing vertex shaded attribute data for at least one vertex attribute for a vertex or group of vertices comprises both using some or all of the vertex shaded attribute data generated by the first vertex shading operation for that determination (as discussed above), and also determining whether memory space has already been allocated for vertex shaded attributes data for the vertex or vertices in question.

Correspondingly, in an embodiment, the technology described herein comprises (and the graphics processing pipeline is operable to) the testing stage first determining using, at least in part, some or all of the vertex shaded attribute data generated by the first vertex shading operation, whether or not memory space should be allocated for storing vertex shaded attribute data for at least one vertex attribute for the vertex or group of vertices (in the manner discussed above, so e.g., and in an embodiment using a "visibility" test for the vertex or a group of vertices), and then, when that test determines for the vertex or group of vertices that memory space should (in principle) be allocated for storing vertex shaded attribute data for the vertex or group of vertices, determining for the vertex or for each vertex of the group of vertices determining whether memory space has already been allocated for vertex shaded attributes data for that vertex, and when it is determined that memory space has already been allocated for vertex attributes data for the vertex, not allocating further memory space for vertex shaded attributes data for the vertex, but when it is determined that memory space has not already been allocated for vertex shaded attributes data for the vertex, allocating memory space for vertex shaded attributes data for the vertex.

It can be determined that memory space has already been allocated for storing vertex attributes data for a vertex in any suitable and desired manner.

In an embodiment, the graphics processing pipeline is configured to keep track of vertices and/or groups of vertices for which memory space has already been allocated for vertex shaded attributes data. This may be achieved in any suitable and desired manner.

In an embodiment, information indicating vertices and/or groups of vertices for which memory space has been allocated for vertex shaded attributes data for the vertex is maintained and stored.

This information can take any suitable and desired form. For example a (vertex) bitmap, that includes respective entries for respective vertices or groups of vertices, with each entry in the bitmap indicating whether a vertex (or group of vertices) (corresponding to that bitmap entry) has had memory space allocated to it, could be used for this purpose. The vertex bitmap could then be accessed using, for example, the tuple {InstanceID, VertexID} as the key for the bitmap lookup.

However, in an embodiment, the information indicating vertices and/or groups of vertices for which memory space has been allocated for vertex shaded attribute data comprises both an indication that memory space has been allocated to the vertex or group of vertices (which a bitmap on its own can provide) and information indicating which memory space (the location of the memory space) that has been allocated to the vertex or group of vertices (which may all be part of the same indication). In other words, the information indicating vertices and/or groups of vertices for which memory space has been allocated in an embodiment also indicates where the memory space was allocated.

As will be discussed further below, in an embodiment the information indicating the location of the memory space that has been allocated to a vertex or group of vertices comprises an allocated internal vertex ID (sequence index) (which will indicate the location of the vertex data in memory at least in the case where all the vertices are allocated in a linear array). Other arrangements, such as using a full pointer (thereby removing any restrictions on the vertex data layout) could be used, if desired.

Thus, in an embodiment, the information indicating vertices and/or groups of vertices for which memory space has been allocated is stored, for example, and in an embodiment, in a cache, which contains a mapping from the input vertex identity to the allocated output vertex identity, with a miss in the cache correspondingly indicating that memory space has not been allocated to the vertex or group of vertices in question.

The cache for this purpose could be a specially allocated cache, but in an embodiment an existing cache of the graphics processing pipeline is used for this purpose, such as, and in an embodiment, a cache that is allocated to store the vertex shaded attributes data (the transformed vertices). In this case, the information indicating vertices and/or groups of vertices for which memory space has been allocated (and where that memory space has been allocated) can be, and is in an embodiment, added to the transformed vertices cache. In such an arrangement, a vertex will, for example, be loaded into the cache when its position is shaded, and then when it is decided that memory space should be allocated to the vertex (e.g. the vertex is visible), the vertex should be (will be) guaranteed to be in the cache, and the appropriate information indicating where the memory space has been allocated can be added to the transformed vertices cache. (The memory space allocation mapping should be valid as long as it lives inside the graphics processor. Thus if the mapping information is flushed out, the position shading is in an embodiment done again, and a new memory space allocation established.)

The information indicating for which vertices memory space for vertex shaded attributes data has already been allocated is in an embodiment then used at the testing stage to determine whether a vertex (or group of vertices) that it has been determined should (potentially) be allocated memory space has already been allocated memory space (or not).

Thus, in an embodiment of the technology described herein, the determination of whether a vertex (or group of vertices) should be allocated memory space (additionally) comprises determining whether the vertex (or group of vertices) has been previously allocated memory space, using, at least in part, information indicating vertices and/or groups of vertices that have been allocated memory space.

Thus, in an embodiment, the testing stage (e.g., and in an embodiment, the tiler) of the graphics processing pipeline is operable to determine whether or not to allocate memory space to a vertex by:

first determining whether the vertex or group of vertices including the vertex could be required for generating the output of the graphics processing operation (in an embodiment by determining whether the vertex belongs to (is to be used for) a primitive that could be visible in the output of the graphics processing operation); and when it is determined that the vertex or group of vertices could be required for generating the output of the graphics processing operation:

then determining from information indicating vertices and/or groups of vertices that have already been allocated memory space, whether the vertex has already been allocated memory space; and when it is determined from the information that the vertex has already been allocated memory space, then not allocating memory space for the vertex, but when it is not (it is other than) determined that the vertex already been allocated memory space, then allocating memory space for the vertex.

Thus in an embodiment, the testing stage, e.g., and in an embodiment the tiler, includes, in effect, a visibility testing stage that determines whether a vertex or group of vertices is required for the graphics processing output being generated, and when it is determined that the vertex or group of vertices is required for the graphics output being generated (e.g., and in an embodiment, is (potentially) visible), that information is provided to a further checking unit, that then checks stored information indicating vertices or groups of vertices that have already been allocated memory space, which checking unit then allocates and/or requests (or not) memory space for the vertex accordingly.

The information indicating which vertices have been allocated memory space (or not) can be stored in any suitable and desired storage that is able to be accessed by the graphics processing pipeline. For example, it could be a dedicated memory for the purpose of storing such information, or it may be part of a memory that is used to store other data in addition to such information. The storage may be any suitable and desired information storage, such as, e.g., a buffer or buffers, a cache or caches, etc. In an embodiment, this information is stored in a local, cache memory, of or accessible to the testing stage of the graphics processing pipeline (or an appropriate stage thereof).

Once it has been determined that memory space should be allocated for vertex shaded attributes data for a vertex or group of vertices, then memory space is requested (and allocated) for that vertex or group of vertices.

The request for memory space to be allocated for the vertex or group of vertices can take any suitable and desired form. In an embodiment, the request comprises information needed by the memory to allocate the memory space for the vertex or group of vertices. In an embodiment the request includes information (an indicator) that identifies it as being a request to allocate memory space to a vertex or group of vertices, and/or an identifier that identifies the request. The request also in an embodiment indicates the amount of memory to be allocated.

The request for memory space is sent to a memory allocator (memory allocator unit) of the graphics processing system. The memory allocator may be a unit that is external to the testing stage (and, e.g., external to the graphics processing pipeline), or it may be part of the testing stage (e.g. tiler), as desired. The memory allocator can operate to allocate the memory space for a vertex or group of vertices in any suitable and desired manner, for example in the normal manner for memory space allocation requests in the graphics processing system in question. Thus the memory allocator can use, for example, any suitable and desired memory allocation process (algorithm).

The memory space that is allocated for vertex shaded attributes data for a vertex can be any suitable and desired memory space. It should be noted in this regard that this memory space will be memory space in the main memory that is being used by and to store data for the graphics processing pipeline and its operations (in contrast, e.g., to the temporary storage of vertex shaded attributes data in, e.g., a FIFO, that may be used to transfer data between the vertex shading stage and the testing stage, for example).

In an embodiment, the memory space that is allocated to (and that is available to be allocated to) a vertex comprises memory space from an appropriate pool of free memory space (a "heap") for use by the graphics processing pipeline.

The memory space pool (heap) will comprise an allocated portion of memory address space (memory addresses) where the vertex data (at least) can be stored. It in an embodiment comprises a pool of contiguous memory addresses, starting from (i.e. having a lowest (bottom) memory address and extending to a top (highest) memory address).

Thus, in an embodiment, a pool of memory space (a set of memory addresses) is set aside (made available) for storing the vertex data, and then when it is determined that memory space should be allocated for storing vertex shaded attributes data for a vertex or group of vertices, a portion of memory (a subset of the memory addresses) of the set aside memory space pool is allocated for storing the vertex data for the vertex or group of vertices. In an embodiment, a selected, particular, in an embodiment predefined, amount of memory space (set of memory addresses) is set aside for storing the vertex shaded attributes data for the set of vertices (together with any other data, such as primitive lists, if any, that is to "share" that same memory space pool).

It should be noted in this regard that while the set of memory addresses for the memory space pool may be set aside initially, the actual individual memory addresses used for vertices should be and will only be allocated when it is determined that memory space (from the pool) should be allocated to a vertex. This is in contrast to arrangements that would simply set aside memory addresses that in fact are allocated to each of the vertices that could potentially need to be processed for the render output being generated.

The memory space pool that is set aside for storing the vertex data can be selected as desired. In an embodiment it comprises less memory space than would be needed simply for storing vertex shaded data for all the vertices that will be provided by the application for the render output. For example, the memory space pool may be configured to have capacity to store data for a more limited number of vertices than all the vertices that will be provided by the application for the render output.

Indeed, it is an advantage of the technology described herein that because memory space can be and is allocated to vertices "on demand" when it is determined that those vertices will be required for generating the render output, a (potentially significantly) smaller amount of memory space can be set aside for storing the vertex data in comparison, e.g., to arrangements which simply set aside sufficient memory space for storing all the vertices that may initially be defined for generating a render output. For example, the Applicants have found that for 3D graphics scenes, between 50-90% of primitives defined for a scene may in fact not be visible (and so not need memory space for their vertices).

In an embodiment, an amount of memory that is based on an expected amount of memory that may be required for storing vertex shaded data (for visible vertices) for the graphics processing output being generated is set aside as the memory space pool. The amount of memory that is set aside in an embodiment includes an additional safety margin (threshold) of memory space above the expected amount of memory space.

The expected amount of memory space can be determined in any suitable and desired manner, for example based on a historic analysis (benchmarking) of different graphics processing outputs. It would also be possible to use information indicative of the memory requirements found in use for previously generated graphics processing outputs (e.g. using the assumption that the requirement for a current graphics processing output (e.g. frame) is likely to be similar to the requirement for the previous graphics processing output (frame or frames) in a sequence of graphics processing outputs (frames) currently being generated).

Other arrangements would, of course, be possible.

It would also be possible to use more sophisticated memory space pool allocation arrangements, such as initially allocating a larger memory space pool in virtual memory, but that is only partially backed-up by physical memory, with the arrangement being that if it is then attempted to write to part of the virtual memory pool that is not backed by a physical memory, more physical memory is then allocated.

The pool of memory space (heap) could be a pool of memory space (heap) set aside specifically for storing vertex shaded attributes data, but in an embodiment, in a tile-based graphics processing system, the memory space for vertex shaded attributes data for vertices is allocated from a pool of memory space (a heap) that is set aside for the storing of primitive lists. In other words, in an embodiment, in the case of a tile-based graphics processing pipeline, the memory space pool (heap) that is set aside for storing the primitive lists is also used to store the vertex shading attributes data (i.e. the "tiler" heap (memory pool) is used for both the primitive lists and vertex shaded attributes data) (there is a memory space pool (heap) that is set aside for (used for) storing both primitive lists and vertex shaded attributes data).

Where the primitive lists and the vertex shaded vertex data share the same memory pool (memory heap), then the respective allocations within the memory pool to the primitive lists and vertex data could be fixed in advance (use a static partitioning into a fixed sized vertex part and a fixed size primitive list part), or could be allowed to be flexible (determined in use, as the memory pool is filled). In an embodiment the graphics processing system is configured so as to be able to enable both static and dynamic partitioning of the memory space pool in use. For example, it may be preferable to use static partitioning for verification testing, but dynamic partitioning otherwise.

Where the primitive lists and the vertex shaded vertex data share the same memory pool (memory heap), then while it would be possible to interleave those two types of data in the memory space pool, i.e. such that both types of data are stored at the next available space starting from one end of the memory pool (and in one embodiment this is what is done) in an embodiment, the primitive lists and the vertices (the vertex shaded attributes data) are stored progressively from respective opposite ends of the memory address space allocated to the pool (heap). Thus, in an embodiment, the primitive lists are allocated memory space and stored from one end of the memory space pool (heap), and the vertices are allocated memory space and stored from the other end of the address space of the memory pool (heap).

In an embodiment, the primitive lists are allocated and stored from the top of the memory space pool (heap) and downward (i.e. starting at and from the highest memory address in the allocated block of memory space), and the vertices are allocated memory space and stored from the bottom up (i.e. starting at and from the lowest address of the allocated overall block of memory space). This has the advantage that the vertices can be stored used contiguous and increasing memory addresses.

In an embodiment, it is determined when the memory space pool has been used up (no longer has sufficient free space to accommodate any further vertex (or vertex or primitive list) data). This can be determined in any appropriate and desired manner, for example in accordance with the memory overflow mechanisms that are otherwise used in the graphics processing system and data processing system that the graphics processing pipeline is part of.

In the case where the primitive lists and the vertices share the same memory space pool, and the primitive lists and vertices are allocated and stored from respective opposite ends of the memory space pool, it can readily be (and in an embodiment is) determined when the memory space pool has been used up (when there is insufficient free space in the memory space pool for further data), by identifying when the primitive list and vertices allocations meet in the memory space pool (start to overlap). This is therefore a further advantage of this arrangement.

In an embodiment, when it is determined that the overall memory space allocation pool has been used up, steps are then taken to (and the system then operates to) make more memory space available for the vertex (e.g. and primitive list) data. This could comprise, for example, requesting a further memory space allocation pool for the vertex (or primitive list and vertex) data. This could be done, e.g., by appropriately signalling the memory overflow situation to the driver for the graphics processing pipeline (graphics processor), such that the driver can (attempt to) allocate more memory space.

Additionally or alternatively, when it is determined that the memory space allocation pool has been used up, the graphics processing pipeline could be triggered to perform the rasterising and rendering pass for those primitives and vertices that have been processed to date, such that the data for those primitives and vertices stored in the memory allocation pool can then be released from that pool so as to free-up space in the pool.

In an embodiment, the processing and testing and allocating of memory space to further vertices or groups of vertices is paused (stalled) while additional memory space is made available. Then, once sufficient space has been added to and/or freed-up in the pool, the process returns to testing further vertices or groups of vertices and allocating memory space for them accordingly.

The allocation of memory space in the memory space pool to a vertex or group of vertices can be determined as desired.

In an embodiment, when a vertex for which it is determined memory space should be allocated for its vertex shaded attributes data is the first vertex in the set of vertices being considered, then the memory address for one end (e.g., and in an embodiment the current bottom allocation pointer) for the memory space pool is set and used as the base address for the vertex shaded attributes data that will be stored for the vertices of the set of vertices (for the vertex buffer).

The allocated base address is in an embodiment stored and/or otherwise handled such that it can be retrieved and used by other elements and components of the graphics processing pipeline when they need it (to identify the base address used for the vertex shaded attributes data).

This can be done in any suitable and desired manner. For example, the base address could be written to an appropriate descriptor for the set of vertices being processed, such as the draw call descriptor when a set of vertices corresponds to a draw call. In this case, the relevant processing units (e.g. vertex shader) should read the updated draw call descriptor, and fetch the base address from the draw call descriptor instead of using an attribute buffer. Alternatively, the base address could be written to an attribute buffer descriptor in memory, with the attribute addressing then using that buffer.

In an embodiment, the base address is made a property of the attribute shading context (with the, e.g. tiler, setting this as a graphics processor internal property), with the subsequent attribute addressing then using that property without needing to read any descriptor from memory (without going through memory).

Once the base address for the vertex shaded attributes data for the set of vertices has been determined, then memory within the memory space pool is in an embodiment allocated to vertices at increasing addresses (and progressively increasing addresses) from that base address as needed as the set of vertices is processed.

In an embodiment, a vertex that has been allocated space within the memory space pool for storing its vertex shaded attributes data is allocated a vertex index which corresponds to the number of the vertex in the sequence of vertices that have been allocated space within the memory space pool (and thus will be a sequential index that will be, in an embodiment one, greater than the index allocated to the immediately preceding vertex that was allocated memory space in the memory space pool (with the first vertex to be allocated memory space in the memory space pool having the lowest index (in the sequence) and in an embodiment an index of "0"). (In other words, the nth vertex of the set of vertices for which memory space is allocated will be allocated an internal vertex ID corresponding to "n" (and so will, e.g., be allocated an internal vertex ID of n−1 in the case where the first vertex in the set is allocated an internal vertex ID of 0). The vertices can be numbered (indexed) in any suitable and desired manner for this purpose, but in an embodiment increasing integers starting at "0" (such that n vertices cover the range [0, n−1]) are used.

It should be noted here that this sequential index that is assigned to a vertex when space is allocated for that vertex within the memory space pool will be a new, "internal" vertex identifier for the vertex in question, and thus in addition to, and different to and separate from, the application generated (API-visible) instance ID or vertex ID that may already have been allocated to the vertex in question.

The so-assigned internal vertex ID (sequential index) for the vertex is then in an embodiment used to control the actual memory allocation for the data of the vertex (and is used, for example, to calculate where in memory to store the vertex shaded attributes data for the vertex in question). In particular, the assigned sequence index for a vertex can be, and is in an embodiment, used together with (and in an embodiment as an offset from) the base address for the vertex data in the memory space pool to determine the memory address at which the data for the vertex in question should be (and is) stored (at least in the case where the memory space pool comprises a contiguous set of (e.g. increasing) memory addresses for storing the vertex data).

The so-assigned internal vertex ID (sequential index) for the vertex is in an embodiment also used to identify the vertex and its stored shaded attributes data in the memory space pool when processing the vertex further.

Other arrangements would, of course, be possible, and it would, for example, be possible to store the vertices (the data for the vertices) at discontinuous memory addresses, although in that case the memory address determination mechanism may become more complex.

Where an internal vertex ID (sequence number) is used for vertices for which vertex shaded attributes data is stored, then in an embodiment, that internal vertex ID (sequential index for the vertex) is used (encoded) in the primitive lists to identify that vertex when it is to be used to form a primitive.

In other words, the encoding of the primitives to be processed in the primitive lists (which would normally, and in an embodiment does, identify the primitives by reference to the vertices that are to be used to form the primitives) in an embodiment uses (only) the new, internal vertex ID (sequence number) that has been assigned to the vertices to identify the vertices that are to be used for each primitive in the primitives lists (rather than, e.g., using the application generated (API-visible) instance ID or vertex ID to identify the vertices making up the primitives in the primitive lists).

In an embodiment, the allocation of memory space within the memory space pool to vertices is performed by first allocating a larger block of memory space from the pool that is sufficient to store vertex shaded attribute data for plural vertices (and so can be thought of as being a "vertex packet"), and then allocating space within that block ("vertex packet") in the memory space pool to individual vertices, until the block ("vertex packet") is full (at which point, if there is still space in the memory space pool, a further block ("vertex packet") is allocated and then progressively filled with vertices, and so on, until there is no more space in the memory space pool for a complete "vertex packet".

(Thus, once one vertex packet is full, a new vertex packet is allocated (if there is space in the memory pool for that), and so on.)

The Applicants have found that this arrangement can facilitate more efficient memory accesses, for example by facilitating using complete cache lines for accessing the vertex data. In particular, this can allow for the fact that while position attributes for vertices may be configured so as to align exactly to a complete cache line (e.g. in the case of 64 byte cache lines and 4 vertices outputting 4×FP32 coordinates), the data for other vertex attributes may not always be appropriately cache line aligned.

Each block (vertex packet) from the memory pool should be and is in an embodiment the same size, and is in an embodiment configured to always be an integer number of cache lines (e.g. an integer number of 64-byte cache lines), no matter the size of the vertex attributes. This means that the start of each new block (vertex packet) will be cache-line aligned.

The number of vertices that a block (packet) can store is in an embodiment set appropriately so as to ensure that a vertex packet will always be an integer number of cache lines. Thus, the number of vertices that a block (packet) can store is in an embodiment set to the number of bytes in a cache line of the cache storing the vertex data (so in the case where the cache for the vertex data supports 64-byte cache lines, the number of vertices in a packet (n) is in an embodiment set to 64). A smaller number of vertices would be possible, but may require padding in the block (vertex packet) to make the positions in the next block (packet) be cache line aligned (i.e. so that the start of the next packet where the vertex positions will be stored is cache line aligned).

In this arrangement, the assigned internal vertex ID (sequence index) for a vertex modulo n (e.g. internal vertex ID modulo 64 for a 64-byte cache line cache) equaling 0 can then be used as a test to indicate that a new block (vertex packet) needs to be allocated (at least in the case where there is a contiguous memory space allocation at increasing addresses).

While it would be possible to store all the attributes (i.e. both positions and varyings) for each vertex in sequence, one after another, in a block (vertex packet), in an embodiment, the vertices are stored within a block of the memory pool (vertex packet) such that the positions (position attributes) for the plural vertices of the packet are stored together, one after another, and the non-position attributes (varyings) of each of the vertices are stored together separately therefrom, again one after another.

In an embodiment, each block (vertex packet) consists of (and stores) n positions starting at offset 0 (one for each of the n vertices in the packet), and then n sets of non-position attributes (varyings) starting at a position q×n bytes into the block (packet) (i.e. starting at a position immediately after all the position data for all the n vertices has been stored) (where n is the number of vertices that a block (packet) will contain, and q is the number of bytes that the position attributes for a vertex will take up (and so will be 16 in the case where a vertex has 4×FP32 position coordinates).

Thus, the position data and the non-position (varyings) data for the vertices in an embodiment is not (is other than) interleaved in a memory space pool block (vertex packet).

When using this arrangement, in order to access the vertex packets, the following addressing scheme is in an embodiment used.

Address=base address+floor(internal vertex ID/$n$)
*packet_size+(internal vertex ID % $n$)*attribute_stride+Attribute_offset.

In this arrangement, the packet_size/attribute_stride/attribute_offset fields can be and are in an embodiment configured statically by the driver, e.g. using a new "vertex packet attribute" descriptor. The internal vertex ID is the sequence index allocated to the vertex in question. n is the number of vertices that will be stored in a vertex packet (and so in an embodiment corresponds to the number of bytes that can be stored in a cache line, such as 64), and the base address is the base address for the overall memory pool where the vertex data is being stored (as discussed above).

Once it has been determined that a vertex will be used for producing the render output and memory space has been allocated for vertex shaded attributes data for that vertex, then vertex shaded attributes data for the vertex should be, and is in an embodiment, stored in the memory space allocated for the data for the vertex in question.

Any suitable and desired vertex shaded attribute data for the vertex can be stored in the allocated memory space.

In an embodiment, at least some, and in an embodiment all, of the vertex shaded attribute data generated by the first vertex shading operation is stored in the memory space allocated to the vertex. Thus, in an embodiment, at least the vertex shaded position attribute or attributes for the vertex are stored in the memory space allocated to the vertex.

In an embodiment, data for one or more other non-position attributes (varyings) for the vertex are stored in the allocated memory space. In an embodiment vertex shaded attribute data is stored for plural, and in an embodiment for each, of the attributes for the vertex that are vertex shaded.

As discussed above, it would be possible for the first vertex shading operation to generate vertex shaded attribute data for all of the attributes of a vertex (that need to be vertex shaded). In that case, all of the vertex shaded attributes data for a vertex would have been generated as part of the first vertex shading operation, and so may therefore be stored in the allocated memory space once that memory space has been allocated.

In this case therefore, the vertex shaded position attribute(s) data is in an embodiment then (immediately) transferred from the testing stage (e.g. the tiler) to the allocated memory space in the memory pool for the vertex in question.

As discussed above, in an embodiment, the first vertex shading operation is operable to vertex shade only some but not all of the attributes for the vertices (e.g., and in an embodiment, to only vertex shade the position attribute(s) for the vertices). In this case therefore if there are further vertex attributes, such as varyings, then those further vertex attributes will remain to be vertex shaded after the first vertex shading operation and the testing operation.

In an embodiment, the vertex shading of those further attributes is correspondingly performed in response to, and conditionally dependent on, the result of the testing stage. This then correspondingly means that further vertex shading operations e.g., and in an embodiment, for vertex attributes that are not required by the testing stage, should be and are in an embodiment (only) performed for those vertices that "pass" the testing stage (e.g., and in an embodiment, that are determined by the testing stage as (potentially) contributing to the render output being generated).

Thus, in an embodiment, the testing stage is operable not only to determine whether or not memory space should be allocated for storing vertex shaded attribute data for at least one vertex attribute for a vertex or group of vertices, but also to determine whether or not a second vertex shading operation to generate vertex shaded attribute data for at least one (other) vertex attribute should be performed for a vertex or group of vertices (and in dependence upon that determination, then requesting and causing a second vertex shading operation to be performed for the vertex or group of vertices).

Thus, in an embodiment, the method of the technology described herein comprises (and the graphics processing pipeline is correspondingly operable (configured) to):

for a set of vertices to be processed by the graphics processing pipeline:
  the vertex shading stage of the graphics processing pipeline performing a first vertex shading operation on one or more vertices of the set of vertices, to generate vertex shaded attribute data for at least one but not all of a plurality of vertex attributes of the one or more vertices of the set;

the testing stage of the graphics processing pipeline determining, for respective vertices or groups of vertices of the one or more vertices that have been subjected to the first vertex shading operation, whether or not a second vertex shading operation to generate vertex shaded attribute data for at least one other vertex attribute of the plurality of vertex attributes of the one or more vertices of the set should be performed for the vertex or group of vertices, wherein the determining comprises using, at least in part, some or all of the vertex shaded attribute data generated by the first vertex shading operation;

the testing stage, in response to determining that a second vertex shading operation should be performed for a vertex or group of vertices, sending a request for a second vertex shading operation to be performed for the vertex or group of vertices; and in response to the request from the testing stage, a vertex shading stage of the graphics processing pipeline performing a second vertex shading operation on the vertex or group of vertices for which the request has been sent, to generate vertex shaded attribute data for the at least one other vertex attribute of the plurality of vertex attributes of the one or more vertices of the set.

At least some, and in an embodiment all, of the vertex shaded attribute data generated by the second vertex shading operation is in an embodiment then stored in the allocated memory space for the vertex or vertices in question (as discussed above).

In this arrangement, unlike in conventional vertex shading arrangements, the vertex shading operation is divided into two parts with a second vertex shading operation that generates vertex shaded data for vertex attributes that were not processed in the first vertex shading operation being performed conditionally, in dependence on the determination of the testing stage (operation). In this way, only a reduced set of vertex shading operations is performed for vertices that it can be determined will in fact be "unused".

In these arrangements, the testing stage in an embodiment performs the same test or tests to determine whether to trigger the second vertex shading operation as is used for determining whether to allocate memory space for vertex shaded attributes data for a vertex or a group of vertices. Thus, in an embodiment, the testing stage performs one overall determination (testing) operation, and uses the result of that operation both to determine whether to allocate memory space for vertex shaded attributes data for a vertex or group of vertices and whether to trigger a second vertex shading operation to vertex shade further attributes for the vertex or group of vertices.

The request for the second vertex shading operation to be performed should be, and is in an embodiment, sent as and when it is determined by the testing stage that the vertex or group of vertices in question should be subjected to the second vertex shading operation.

In an embodiment, the request is sent when it is determined that a given vertex or group of vertices should be subjected to a second vertex shading operation, and before it is determined if another (and in an embodiment if the next) vertex (or group of vertices) in the set that has been subjected to the first vertex shading operation should be subjected to the second vertex shading operation.

The request for the second vertex shading operation to be performed can take any suitable and desired form. In an embodiment, the request comprises information needed by the graphics processing pipeline to be able to carry out the second vertex shading operation. In an embodiment the request includes information (an indicator) that identifies it as being a request to trigger the second vertex shading operation, and/or an identifier that identifies the request.

The request in an embodiment also indicates one or more of, and in an embodiment all of: a job (task) identifier (ID), an vertex identifier (ID), an instance identifier (ID), and a memory identifier (ID).

The job ID in an embodiment identifies the graphics processing job (task), e.g., and in an embodiment, the draw call, that the vertex or group of vertices in question relate to, and in an embodiment identifies, in an embodiment uniquely, the shader program to run (to be executed), and/or the configuration of attributes and/or stacks, etc., and/or other information, that is required to run (execute) a shader program. This information is in an embodiment static for the entire job (task) (e.g. draw call).

The vertex ID and instance ID information should be, and are in an embodiment, the application assigned (API-visible) vertex ID and instance ID that indicate the vertex (or vertices) within the job (task) in question.

The memory ID information in an embodiment allows the location in memory at which the output (vertex-shaded attributes data) should be stored to be determined (either using the memory ID alone, or in combination with other information). In an embodiment, the new assigned internal vertex identifier (sequence index) is used and sent for this purpose.

The (sequence index) internal vertex ID that is part of the request is in an embodiment used, as discussed above, together with packet_size/attribute_stride/attribute_offset, and base address, by the second vertex shading operation to determine where to write its vertex shaded outputs. The packet_size/attribute_stride/attribute_offset values and base address can be provided to the second vertex shading operation in any suitable and desired manner, such as, and in an embodiment, in one of the manners discussed above.

Thus, in an embodiment, the request for the vertex shading operation (and the information that is provided to the shader core that is executing the second vertex shading operation) comprises both the API-visible instance ID and vertex ID values (to use for reading values provided by the application), and the internal sequence index vertex ID (to use to determine where to store the outputs of the vertex shading operation for later use).

The request to trigger the second vertex shading operation can be sent by the testing stage (e.g. tiler) to any desired and suitable stage of the graphics processing pipeline so as to trigger the second vertex shading operation.

For example, the request could be sent directly to a shader core that is configured to execute vertex shading operations. However, in an embodiment, the request is sent to a stage of the graphics processing pipeline that is configured to manage (control) one or more processes of the graphics processing pipeline. In an embodiment the request is sent to a stage of the graphics processing pipeline that receives and/or distributes respective processing tasks (jobs) to processing units (functional units) of the graphics processing pipeline.

For example, the request can be (and in an embodiment is) sent to a job (task) management stage (a job manager) of the graphics processing pipeline, which manager stage of the graphics processing pipeline can and in an embodiment does then trigger the second vertex shading operation for the vertex or group of vertices in question, e.g., and in an embodiment, by issuing that vertex shading operation to an available shader processing (execution) core.

The performing of the second vertex shading operation for the vertex or group of vertices to which a request that operation relates can be triggered and done in any suitable and desired manner.

For example, where the second vertex shading operation is performed by executing execution threads for the vertices to which the request relates then in one embodiment, an execution thread for the second vertex shading operation is only generated and issued if a request for a second vertex shading operation is sent for a vertex (or group of vertices).

However, in a different embodiment, threads for execution are created for the second vertex shading operation for all the vertices in the set, before it is determined whether the vertices should be subjected to the second vertex shading operation. Each thread is then in an embodiment only "fully" executed if an appropriate request is sent from the testing stage.

The second vertex shading operation operates to "vertex shade" at least one other attribute of the vertex or group of vertices that it has been determined should be subjected to a second vertex shading operation. In an embodiment, the second vertex shading operation vertex shades all the remaining attributes of the vertices in question. It may also vertex shade the attributes that were processed by the first vertex shading operation, but that is not preferred (as vertex shaded versions of those attributes will have already been derived by the first vertex shading operation).

The second vertex shading operation in an embodiment operates to vertex shade the varyings (i.e. non-position attributes) for the vertices, such as one or more of, and in an embodiment all of: colour, texture coordinates, normals, etc.

The partitioning of the vertex attributes between the first and second vertex shading operations can be selected as desired, e.g. based on the relative processing requirements of the attributes.

The first and second vertex shading operations are in an embodiment implemented by means of a vertex shader core executing an appropriate vertex shader (vertex shading program) for the vertices. Each vertex to be processed is in an embodiment represented as an execution thread, which threads execute the appropriate vertex shading program to carry out the vertex shading operations. In an embodiment there is one execution thread per vertex to be processed.

The vertex shader (vertex shading program) that the vertex execution threads execute for the first and second vertex shading operations can be configured in any desired and suitable manner. They in an embodiment comprise limited (e.g. lightweight) versions of the vertex shader that has been defined for the graphics processing output (e.g. draw call) in question. For example, for each vertex shading operation, the vertex shading program in an embodiment comprises only part but not all of the vertex shader that has been defined for the graphics processing output (e.g. draw call) in question.

The configuration of the vertex shader (vertex shading program) for the first vertex shading operation can be achieved in any suitable and desired manner. In an embodiment, the vertex shader (vertex shading program) supplied by the application that requires the graphics processing (i.e. that has been defined for the graphics processing output in question) is modified to remove (delete) the attributes that are not to be processed by the first vertex shading operation and then recompiled.

Correspondingly, the configuration of the vertex shader (vertex shading program) for the second vertex shading operation can be achieved in any suitable and desired manner. In an embodiment, the vertex shader (vertex shading program) supplied by the application that requires the graphics processing (i.e. that has been defined for the graphics processing output in question) is modified to remove (delete) the attributes that are not to be processed by the second vertex shading operation and then recompiled.

The first and second vertex shading operations (vertex shading stages) could be implemented in separate vertex shading execution cores of the graphics processing pipeline. However, in an embodiment they are performed as respective, different, passes in the same vertex shading execution core.

Other arrangements for deriving the vertex shaders (the vertex shading programs) for the first and second vertex shading operations would, of course, be possible.

In an embodiment of the technology described herein, the graphics processing pipeline is configured to keep track of vertices and/or groups of vertices that have been subjected to the second vertex shading operation.

This is in an embodiment done in a corresponding or the same manner to keeping track of those vertices that have been allocated memory space, as discussed above. Thus, in an embodiment information indicating vertices and/or groups of vertices that have been subjected to the second vertex shading operation is maintained and stored, and in an embodiment then used at the testing stage to determine whether a vertex (or group of vertices) that it has been determined should (potentially) be subjected to the second vertex shading operation has already been subjected to the second vertex shading operation (and thus should be subjected to the second vertex shading operation or not).

In an embodiment a single (the same) set of information is used for both tracking those vertices that have been allocated memory space and those vertices that have been subjected to the second vertex shading operation.

Once the complete vertex shaded attribute data for the vertices that are to be processed has been generated and stored in the allocated memory space (whether following a conditionally triggered second vertex shading operation or not), then the complete vertex shaded attributes data for the vertices (i.e. the vertex shaded data from the first or first and second vertex shading operations), together with, e.g., the primitive lists generated by the tiler, can be, and in an embodiment is, used by the remaining stages of the graphics processing pipeline to generate the desired output (render target) of the graphics processing pipeline.

This processing can include, inter alia, primitive (e.g. triangle) setup, rasterisation and rendering. These processes can be performed in any desired and suitable manner, e.g. depending upon the nature of the graphics processing pipeline in question. The final output of the graphics processing operation can then, e.g., be written, e.g. to a frame buffer, in main memory, from where it can then, e.g., be provided to a display for display, or otherwise processed.

This processing will, inter alia, read the relevant vertex shaded vertex data from the allocated memory space (memory addresses) where it has been stored.

As will be appreciated from the above, the operation in the manner of the technology described herein can be performed for individual vertices, or for groups of plural vertices together, as required. This can be in respect of the various processing (e.g. testing) operations, memory space allocation operations, the vertex shading operations, etc.

In an embodiment, a (and in an embodiment each) request that is sent for a memory space allocation, relates to (and requests the corresponding memory space allocation, for) a group of plural vertices, e.g., and in an embodiment, for a group of four vertices. This is in an embodiment done irrespective of whether the actual testing and determination is performed for individual vertices or groups of vertices. This has the advantage of reducing the number of requests that need to be sent in the system (and the resources required, e.g., to track those requests), and also facilitates more efficient cache use for the relevant data.

In this case therefore, where, e.g., a single vertex is tested, then either a request could be sent for that vertex together with one or more other vertices, e.g. three other vertices (where a request relates to groups of four vertices), to be allocated memory space, or the system could wait until, e.g., four, vertices have been determined as needing to be allocated memory space before a corresponding request for those, e.g. four, vertices to be allocated memory space is sent.

In the former case, once a vertex is determined as needing to be allocated memory space, the other vertices that the request indicates as to be allocated memory space (in addition to the vertex in question) are in an embodiment vertices that could be related to and/or associated with the vertex in question, such as, and in an embodiment, the next vertices in the vertex index sequence.

Similarly, in an embodiment, a (and in an embodiment each) request that is sent for the vertex shading operations relates to (and requests the corresponding vertex shading operation for) a group of plural vertices, e.g., and in an embodiment, for a group of four vertices. This is in an embodiment done irrespective of whether the actual testing and determination is performed for individual vertices or groups of vertices. This again has the advantage of reducing the number of requests that need to be sent in the system (and the resources required, e.g., to track those requests), and also facilitates more efficient cache use for the relevant data.

In this case therefore, where, e.g., a single vertex is tested, then either a request could be sent for that vertex together with one or more other vertices, e.g. three other vertices (where a request relates to groups of four vertices), to undergo the vertex shading operation in question, or the system could wait until, e.g., four, vertices have been determined as needing to be subject to a vertex shading operation before a corresponding request for those, e.g. four, vertices to be subjected to the vertex shading operation is sent.

In the former case, once a vertex is determined as needing to undergo a vertex shading operation, again the other vertices that the request indicates as to undergo the operation (in addition to the vertex in question) are in an embodiment vertices that could be related to and/or associated with the vertex in question, such as, and in an embodiment, the next vertices in the vertex index sequence.

The Applicants have previously proposed in their UK Patent No. 2488668, for example, an arrangement in which for vertex attributes whose values are not affected by vertex shading, vertex shading is not performed, and instead subsequent graphics processing stages, such as the renderer (fragment shader) read the original input attribute values instead.

In order to facilitate such operation in combination with the technology described herein, in an embodiment, information (e.g. a "remapping" table) is provided to allow an internal vertex ID (sequence index) assigned to a vertex in accordance with the technology described herein to be mapped back to the corresponding API-assigned vertex ID and instance ID for the vertex.

This may be done in any appropriate and desired manner.

For example, the API-visible instance ID and vertex ID for a vertex could be stored (e.g. written into the vertex packet (memory space allocated to the vertex) as (additional) attributes for the vertex. The assigned new internal vertex ID (sequence index) could then be used to read the API-visible instance ID and vertex ID from the allocated memory space for the vertex in question, with the read instance ID and vertex ID then being used to retrieve the input attribute value(s) (in the manner as described in GB-B-2488668).

This encoding may be made more efficient, for example, in the case where the graphics processing pipeline operates on groups of four vertices which will all have the same instance ID and sequentially increasing vertex IDs by storing only one instance ID and vertex ID for each group of four vertices (as the instance ID and vertex IDs for each of the vertices in the group can be determined from that single set of ID values).

It would also or instead be possible to make the fragment frontend aware of the remapping entries, for example by encoding a remapping mode in a suitable descriptor, and to then have the frontend preload the values and store them in a primitive table for use by the graphics processor. That would then facilitate the relevant graphics processing pipeline stages (e.g. varying shader) having direct access to any of the instance ID, vertex ID or internal vertex ID for a vertex and being able to choose any of those to use for fetching attribute values from memory.

Other arrangements would, of course, be possible.

The process of the technology described herein can be repeated for the next render output (e.g. the next frame to be displayed) and so on. The technology described herein is in an embodiment implemented for a sequence of frames to be displayed, and in an embodiment for each frame in a sequence of frames to be displayed, for example.

The above describes the elements of the graphics processing pipeline that are involved in the operation in the manner of the technology described herein. As will be appreciated by those skilled in the art, the graphics processing pipeline can otherwise include, and in an embodiment does include, any one or one or more, and in an embodiment all, of the other processing stages that graphics processing pipelines normally include. Thus, for example, the graphics processing pipeline in an embodiment also includes a primitive setup stage, a rasteriser and a renderer. In an embodiment the renderer is in the form of or includes a programmable fragment shader.

The graphics processing pipeline may also contain any other suitable and desired processing stages that a graphics processing pipeline may contain such as a depth (or depth and stencil) tester, a blender, etc.

In an embodiment, the graphics processing pipeline comprises, and/or is in communication with, one or more memories and/or memory devices that store the data described herein, and/or that store software for performing the processes described herein. The graphics processing pipeline may also be in communication with the host microprocessor, and/or with a display for displaying images based on the output of the graphics processing pipeline.

The technology described herein should (and in an embodiment does) produce some useful output data, e.g. images that may be displayed on a display, based on the primitive lists, etc. In an embodiment, the vertex shaded attribute data generated during the vertex shading stage and stored in the memory space allocated by the memory allocator is used in later stages of the graphics processing pipeline to generate a render output.

The render output to be generated may comprise any render output that is to be generated by the graphics processing pipeline. Thus it may comprise, for example, a tile to be generated in a tile based graphics processing system, and/or a frame of output fragment data. The technology described herein can be used for all forms of output that a graphics processing pipeline may be used to generate, such as frames for display, render-to-texture outputs, etc. In an embodiment, the render output is an output frame.

The technology described herein may be carried out by any kind of graphics processing system. However, in an embodiment, the graphics processing pipeline and system is a tile-based (tiling) graphics processing pipeline and system. In this case, the pipeline in an embodiment also comprises a tile buffer for storing tile sample values and/or a write out unit that operates to write the data in the tile buffer (e.g. once the data in the tile buffer is complete) out to external (main) memory (e.g. to a frame buffer).

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In some embodiments, the technology described herein is implemented in computer and/or micro-processor based system.

The technology described herein is in an embodiment implemented in a portable device, such as, and in another embodiment, a mobile phone or tablet.

The various functions of the technology described herein can be carried out in any desired and suitable manner. For example, the functions of the technology described herein can be implemented in hardware or software, as desired. Thus, for example, the various functional elements, stages, etc. of the technology described herein may comprise a suitable processor or processors, controller or controllers, functional units, circuit or circuits, circuitry, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuit/circuitry, e.g., in the form of one or more fixed-function units (hardware) (processing circuits/circuitry), and/or in the form of programmable processing circuit/circuitry that can be programmed to perform the desired operation. Equally, any one or more of the processing stages and processing stage circuit/circuitry of the technology described herein may be comprised as a separate circuit element to any one or more of the other processing stages or processing stage circuit/circuitry, and/or any one or more or all of the processing stages and processing stage circuits/circuitry may be at least partially formed of shared processing circuits/circuitry.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a dataprocessor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

FIG. 1 schematically illustrates a tile-based graphics processing pipeline 10 according to an embodiment of the technology described herein.

As shown in FIG. 1, the graphics processing pipeline 10 comprises a position shading stage 11, a tiler 12, a varying-only vertex shading stage 13 and a fragment shading stage 14.

The position shading stage 11 is a vertex shading stage of the graphics processing pipeline 10 that is configured to perform a first vertex shading operation to vertex shade the positional attributes only of the vertices being processed. The tiler 12 triggers this first vertex shading operation conditionally on a per-vertex (or per-group of vertices) basis as part of its operation. Thus, in this embodiment, the position shading operation 11 is implemented in parallel with the tiling operation 12 of the graphics processing pipeline 10.

The position shading stage 11 is operable to receive vertices (that is, the data values associated with the original attributes for the vertices) from the application that requires the graphics processing. The position shading stage 11 will then perform vertex shading computations on the positional attributes of those vertices (e.g. by means of some transformation function) to generate partial vertex shaded data (that is, partially shaded vertices where only the positions have been "shaded" (e.g. transformed)).

The position-shaded data is then fed to the tiler 12 of the graphics processing pipeline 10 via a FIFO 314.

The tiler 12 uses this input, together with a list of the primitives to be processed (which is indicated in terms of the respective indices of the vertices making up each primitive), to identify which primitives should be processed for each tile that the render output has been divided into, and prepares a respective primitive list (tile list) for each tile (and/or set(s) of plural tiles), indicating the primitives that should be processed for that tile. The tiler 12 can sort the primitives into tiles using any desired and suitable technique for that process. (It will be appreciated here that the only vertex shaded data required for the tiler to generate the primitive list(s) is the vertex shaded position data.)

As part of its operation, the tiler 12 will identify primitives that are required to be processed further to generate the render output. This may include, for example, performing view frustum and back-face culling tests on the primitives.

In the present embodiment, the tiler also operates to determine which vertices should be allocated memory space for storing their vertex shaded attributes data in a pool 15 of memory space that has been set aside for storing the vertex shaded attributes data. The tiler does this by assuming that each vertex that is to be included in a primitive list (i.e. each vertex that has been determined to belong to a visible primitive) should be allocated memory space in the memory space pool for the vertex shaded attributes data.

As part of this memory allocation determination, the tiler also determines whether a given vertex has already been allocated memory space in the memory space pool for its vertex shaded attributes or not (and only allocates new memory space in the memory space pool 15 to a vertex if it is determined that memory space has not already been allocated to that vertex).

The memory space allocation operation will be discussed in more detail below.

In the present embodiment, the memory space pool 15 is a set of contiguous memory addresses (memory space) in the main memory that is being used by the graphics processing pipeline for its data storage. Other arrangements would, of course, be possible.

After it has been determined by the tiler 12 that a vertex (or group of vertices) should be allocated memory space in the memory space pool 15, the graphics processing pipeline is triggered to allocate memory space for the vertex or group of vertices in the memory space pool 15.

In the present embodiment, the tiler also operates to determine which vertices should be subjected to a second vertex shading operation. The tiler 12 does this by again assuming that each vertex that is to be included in a primitive list (i.e. each vertex that has been determined to belong to a visible primitive) should be subjected to a second vertex shading operation.

After it has been determined by the tiler 12 that a vertex (or group of vertices) should be subjected to a second vertex shading operation, the varying only vertex shading stage 13 is triggered to perform vertex shading computations (a second vertex shading operation) on the remaining varying data (attributes) of the vertex (or group of vertices) in question.

In the present embodiments, the varying shading stage 13 is configured to perform vertex shading computations on a vertex or group of vertices on demand, i.e. as and when it is determined that a vertex (or group of vertices) should be subjected to the second vertex shading operation. This will be discussed in more detail below.

It will be appreciated that any vertices that have been subjected to the second vertex shading operation at the varying-only vertex shading stage 13 will now have a complete set of vertex shaded attributes. This data can then be used, together with the tile primitive lists (generated by the tiler 12), to generate the desired output of the graphics processing pipeline, such as a frame for display.

Thus, the vertex shaded positions and varyings data (and the primitive lists) are stored in the allocated memory space in the memory space pool 15, and read therefrom by the fragment shader stage 14 of the graphics processing pipeline 10 for subsequent processing.

The fragment shader stage 14 performs appropriate fragment front-end, rendering (fragment shading), and fragment back-end, processing operations.

The front end operations include primitive (triangle) setup and rasterisation of the primitives.

The rasteriser will receive primitives to be rasterised, test those primitives against sampling point positions, and generate graphics fragments to be rendered representing the primitives accordingly. Each fragment generated by the rasteriser may represent (have associated with it) a single sampling point, or plural sampling points, as desired. In an embodiment, each fragment represents a set of plural, in an embodiment four (2×2), sampling points.

The renderer then processes the fragments generated by the rasteriser to generate rendered fragment data (such as red, green and blue (RGB) colour values and an "Alpha" (transparency) value) for (covered) sampling points that the fragments represent, as is known in the art. These rendering processes may include, for example, fragment shading, blending, texture-mapping, etc. In the present embodiment, the renderer is, as shown in FIG. 1, in the form of a programmable fragment shader.

The rendered fragment data (sampling position data) is then written to a tile buffer and, subsequently, written out as pixel data to a frame buffer, e.g. for display (not shown) (this may include backend fragment operations, such as downsampling, to determine the final pixel colours to be stored in the frame buffer).

It will be appreciated that whilst the first and second vertex shading stages (reference numerals 11 and 13, respectively) are shown as separate stages of the graphics processing pipeline of FIG. 1, in an embodiment the first and second vertex shading operations are performed as respective, different, passes in the same vertex shading execution core.

An embodiment of this arrangement will now be described in more detail with respect to FIG. 2.

Figure 2:
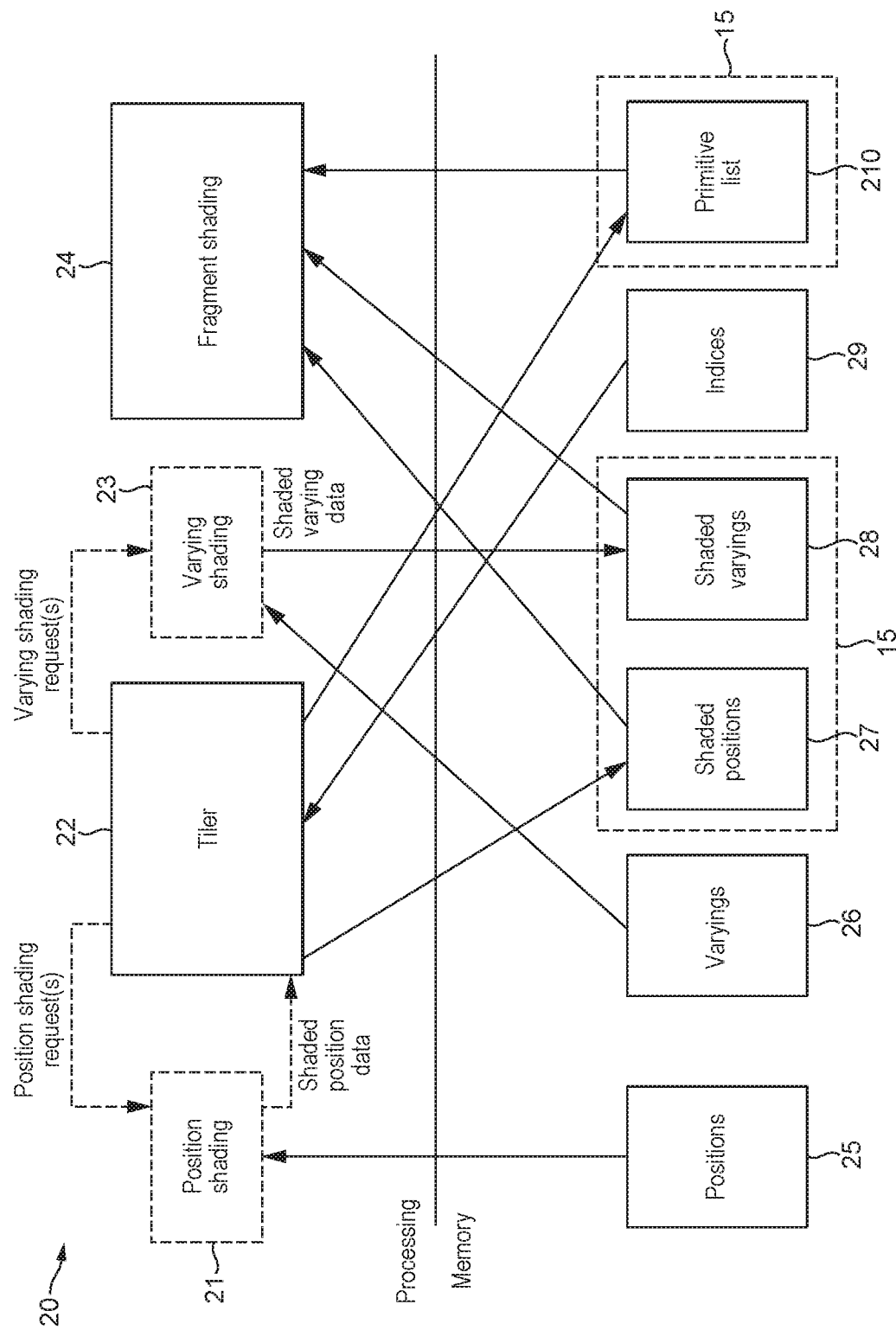
FIG. 2 schematically illustrates the data flow between various stages of a graphics processing pipeline according to an embodiment of the technology described herein.

FIG. 2 schematically illustrates the data flow between various stages of the graphics processing pipeline 20 according to an embodiment of the technology described herein in which the position shading operation and the varying shading operation are controlled by the tiler 22 as part of the tiler job (task).

FIG. 2 shows the following processing stages of the graphics processing pipeline 20: a position shading stage 21, a tiler 22, a varying-only vertex shading stage 23 and a fragment (frontend and) shading stage 24. The graphics processing pipeline 20 also has access to suitable memory for storing data to be processed or generated by the various processing stages of the graphics processing pipeline 20. In particular, memory is allocated for: raw position data (at memory block 25), raw varyings data (at block 26), vertex-shaded (transformed) position data (at block 27), vertex-shaded (transformed) varyings data (at block 28), index data (at block 29) and primitive list data (at block 210).

The tiler 22 is configured to read a list of indices defining a set of vertices to be processed by the graphics processing pipeline, from memory block 29 (although other sources can be used). The tiler 22 will determine whether or not vertex shading is required for the positional attributes of the vertices. This is done by determining whether or not already transformed position data for the vertices is already stored in memory. If transformed position data is not already stored in memory for a vertex (or group of vertices), this is taken as an indication that vertex shading is required for that vertex (or group of vertices).

If vertex shading is required, the tiler 22 will trigger the vertex shading for the positional attributes of the vertices. This is done by the tiler 22 sending a position shading request for the vertices for the position shading stage 21 (which is implemented in a vertex-shading core (not shown)) of the graphics processing pipeline 20. Thus, the tiler 22 is operable to trigger vertex shading for the positional attributes of the vertices as needed during the tiling operation.

In response to a position shading request for the vertices, the position shading stage 21 will read in the raw position attributes data for the vertices from memory 25. The position shading stage 21 will then perform vertex shading computations on the positional attributes of the vertices (e.g. by means of some transformation function) to generate vertex-shaded data for the position attributes of the vertices. The transformed position data is then sent to the tiler 22, where it can be used further.

The tiler 22 uses the transformed position data and the list of indices to identify which primitives should be processed for each tile that the render output has been divided into, and prepares (and stores in memory 210) a respective primitive list (tile list) for each tile (and/or for set(s) of plural tiles), indicating the primitives that should be processed for that tile. As mentioned above with respect to FIG. 1, the tiler 22 can sort the primitives into tiles using any desired and suitable technique for that process. (It will be appreciated here that the only vertex shaded data required for the tiler 22 to generate the primitive list(s) is the vertex shaded position data.)

As part of its operation, the tiler 22 will also identify primitives that should be processed further to generate the render output. This may include, for example, performing visibility tests on the primitive, such as view frustum and back-face culling tests. Invisible primitives (and their respective vertices) are then culled, whilst the (e.g. at least partially) visible primitives are included in the primitive lists in memory 210.

As discussed above, in the present embodiment, the tiler 22 also operates to determine which vertices should be allocated memory space in the memory space pool 15 for storing their vertex shaded attribute values. Thus, as shown in FIG. 2, the shaded positions 27 and shaded varyings 28 are stored in memory in the memory space pool 15 (which, as shown schematically in FIG. 2, also stores the primitive lists 210).

The tiler determines which vertices should be allocated memory space in the memory space pool 15 for their vertex shaded attribute data by assuming that each vertex that belongs to a primitive that is to be included in a primitive list (i.e. each vertex that has been determined to belong to a (potentially) visible primitive) should be allocated memory space in the memory space pool 15.

As shown in FIG. 2, the vertex shaded position attributes data 27 is also stored at this point in the allocated memory space in the memory space pool 15 by the tiler (for those vertices that is determined will potentially be visible, and so should be allocated memory space in the memory space pool 15).

As discussed above, in the present embodiment, the tiler 22 also operates to determine which vertices should be subjected to the second, varying shading, vertex shading operation 23. The tiler 22 again does this by assuming that each vertex that belongs to a primitive that is to be included in a primitive list (i.e. each vertex that has been determined to belong to a (potentially) visible primitive) should be subjected to the second, varying shading, vertex shading operation.

When the tiler 22 determines that a vertex (or group of vertices) should be subjected to the second, varying shading, vertex shading operation 23, the tiler 22 triggers the varying only vertex shading stage 23 to perform vertex shading operations on the remaining varying data (attributes) of the vertex (or group of vertices).

In the present embodiments, the tiler 22 is operable to trigger the varying only vertex shading stage 23 to perform its vertex shading computations on demand, i.e. as and when it is determined that a primitive (to which the vertex or group of vertices belong) is to be included in a primitive list.

This is done by the tiler 22 sending a varying shading request for the vertex (or group of vertices) as soon as it determines that a primitive (to which the vertex or group of vertices belong) is to be included in a primitive list, and in particular, before the tiler 22 proceeds to process another primitive (to determine if that other primitive is to be included in the primitive list).

In response to a varying shading request for the vertex (or group of vertices) from the tiler 22, the varying shading stage 23 reads in the raw varying attributes data for the vertex (or group of vertices) from memory 26. The varyings shading stage 23 then performs vertex shading computations on the varyings attributes of the vertex (or group of vertices) to generate vertex-shaded data for the varyings attributes of the vertex (or group of vertices). The shaded, transformed varyings data is then stored in memory 28 (in the allocated space in the memory space pool 15), where it can be used later on by the graphics processing pipeline 20.

This process is repeated for each primitive that falls to be considered for the render output in question.

After the varying shading stage 23 has generated vertex-shaded data for the varyings attributes of all of the vertices that should be subjected to the second vertex shading operation, the vertex-shaded data for those vertices (both the transformed position and transformed varyings data) is read by the shader core in the fragment shading stage 24.

In this stage, the shader core renders the framebuffer according to the list of primitives in the primitive list, using the transformed position and varyings data. The fragment shading stage 24 reads the transformed positions and varyings from memory blocks 27 and 28, respectively, for all the vertices included in the primitive lists.

This process can then be repeated for the next render output (e.g. draw call), and so on.

As discussed above, in the present embodiment, the tiler 12 is operable to, in response to determining that a primitive will be potentially visible in the render output being generated, both allocate memory space for storing vertex shaded attributes data for the vertices of the primitives in the memory space pool 15, and trigger the second, varying only vertex shading for the vertices of the primitive.

Figure 4:
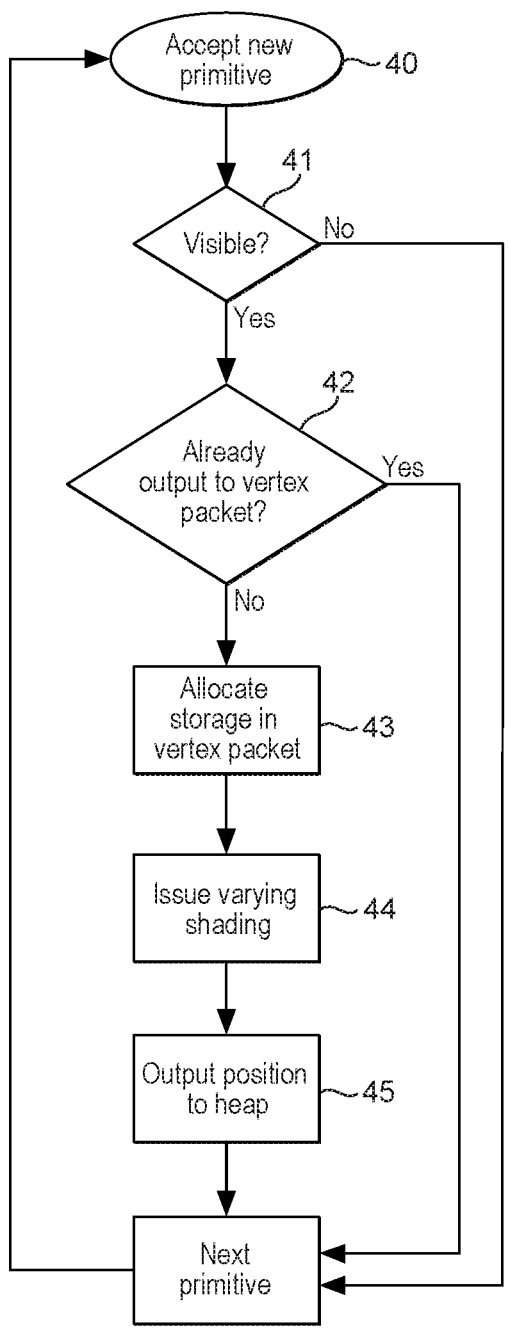
FIG. 4 is a flowchart showing the allocation of memory space to vertices in an embodiment of the technology described herein.

FIG. 4 illustrates this operation of the tiler.

In particular, as shown in FIG. 4, the tiler will accept a new primitive (step 40) and determine if that primitive is (potentially) visible (step 41) (in the present case by determining whether the primitive should be placed in a primitive list or not).

If the tiler determines that the primitive is not visible, then, as shown in FIG. 4, the process moves on to the next primitive.

On the other hand, if the tiler determines that the primitive is (potentially) visible at step 41, it then determines for each vertex of the primitive, whether the vertex has already been allocated memory space in the memory space pool 15 (step 42). If the tiler determines that all the vertices of the primitive have already been allocated memory space, then the process proceeds to the next primitive.

On the other hand, for any vertices of the primitive for which memory space has not already been allocated in the memory space pool 15, memory space is then allocated in the memory space pool 15 for that vertex or vertices (step 43).

Correspondingly, the tiler requests the varying shading for that vertex or vertices (step 44).

As shown in FIG. 4, the tiler also outputs the vertex shaded position data for the vertex or vertices to the allocated memory space in the memory space pool 15 (step 45).

The process then proceeds to the next primitive for the render output being generated, and so on.

FIGS. 5 to 10 show the allocation of memory space for vertices and primitive (polygon) lists in the memory space pool 15 in the present embodiment in more detail. In the present embodiment, the tiler heap (memory pool) that stores the polygon (primitive) lists generated by the tiler is used as the memory pool 15, but that tiler heap is used to store both vertex shaded vertex data 50 as well as the polygon lists 51.

Figure 5:
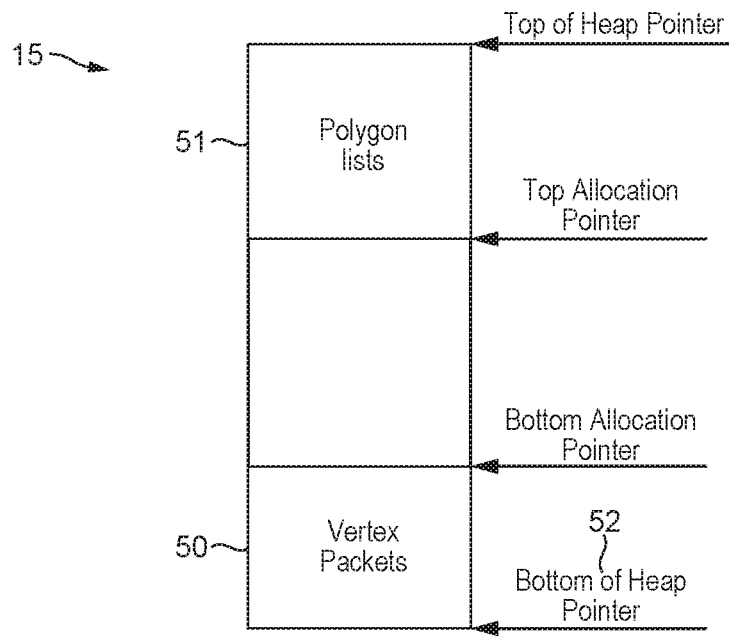
FIGS. 5, 6, 7, 8, 9 and 10 show schematically the organisation of vertex data in a memory space pool in an embodiment of the technology described herein.

As shown in FIG. 5, in the present embodiments, the polygon lists are allocated in the top of the heap 15 and downwards, and the vertices are allocated from the bottom up (and so use contiguous, increasing addresses for the vertices). As shown in FIG. 5, the vertex data is allocated space in the tiler heap 50 as respective "vertex packets". This will be discussed in more detail below with reference to FIGS. 9 and 10.

Figures 6, 7:
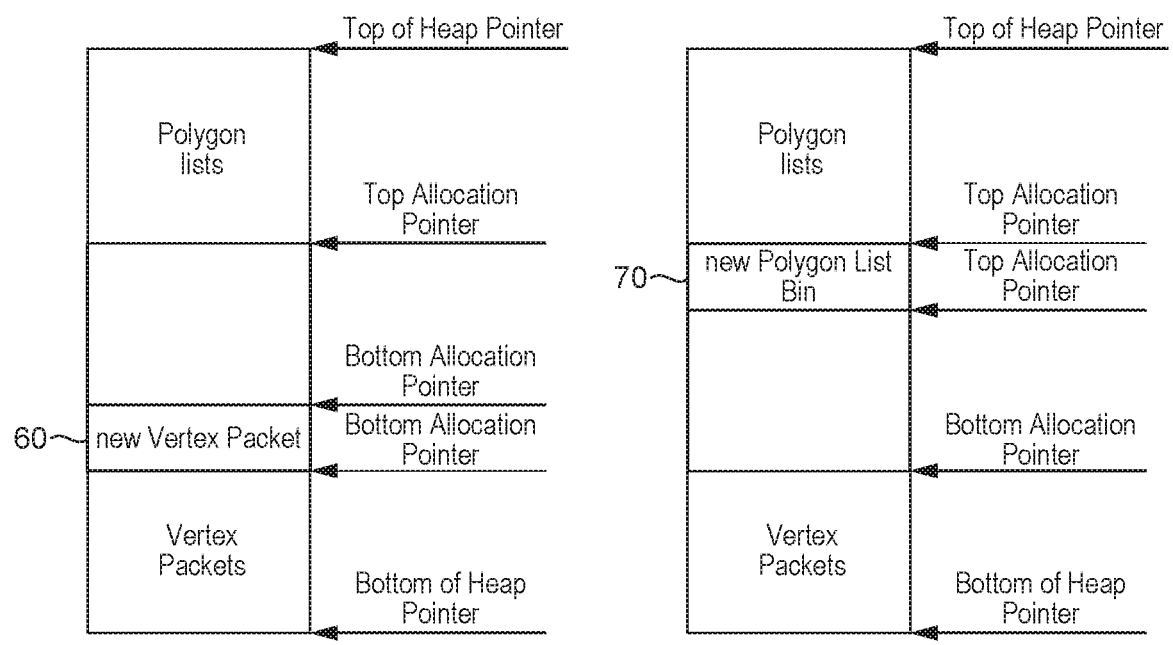

FIG. 6 illustrates the addition of a new vertex packet 60 from the bottom up in the tiler heap (memory space pool) 15. FIG. 7 correspondingly illustrates the addition of a new polygon (primitive) list bin 70 from the top down of the memory space pool (tiler heap) 15.

Figure 8:
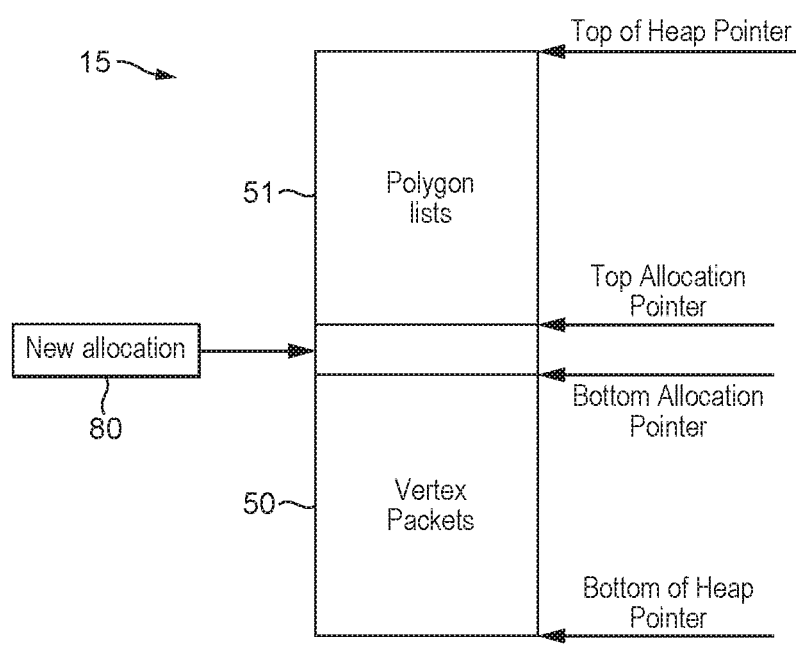

FIG. 8 shows the occurrence of an "out of memory" situation where a new memory space allocation (whether for a vertex packet or a polygon list bin) requires more room than is available in the memory space pool (tiler heap) 15. This situation can be identified when the new memory space allocation 80 will move the corresponding top or bottom allocation pointer to overlap with the other of the top and bottom allocation pointers (thereby indicating an out of memory situation).

In response to this, an appropriate "out-of-memory" operation is performed. This could comprise, for example, requesting a further memory allocation to the memory space pool (tiler heap) 15 (e.g. via the driver for the graphics processing pipeline), and/or triggering rasterising and rendering using the polygon lists and vertex packets presently stored in the memory space (tiler heap) 15 so as to free-up space in the memory space pool (tiler heap) 15. The addition of new polygon list bins and vertex packets to the memory space pool (tiler heap) 15 is stalled until the out of memory situation has been resolved.

As shown in FIGS. 5 to 8, the allocation of memory space within the memory space pool 15 to vertices is performed by first allocating larger blocks of memory space from the pool ("vertex packets") that are each sufficient to store vertex shaded attribute data for plural vertices. Memory space within a vertex packet 50 in the memory space pool is then allocated to individual vertices, until the vertex packet is full (at which point, if there is still space in the memory space pool 15, a further vertex packet is allocated and then progressively filled with vertices, and so on, until there is no more space in the memory space pool for a complete vertex packet).

Each block (vertex packet) 50 is the same size, and is configured to be an integer number of cache lines, no matter the size of the vertex attributes. This means that the start of each new block (vertex packet) will be cache-line aligned.

Figure 9:
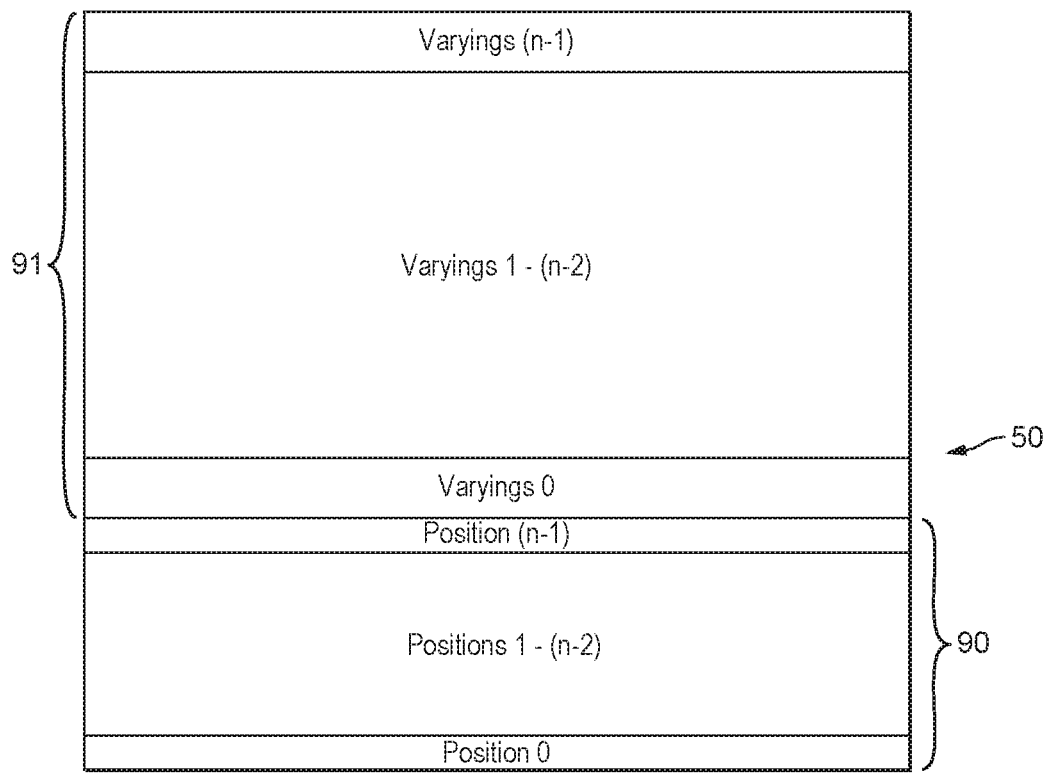
Figure 10:
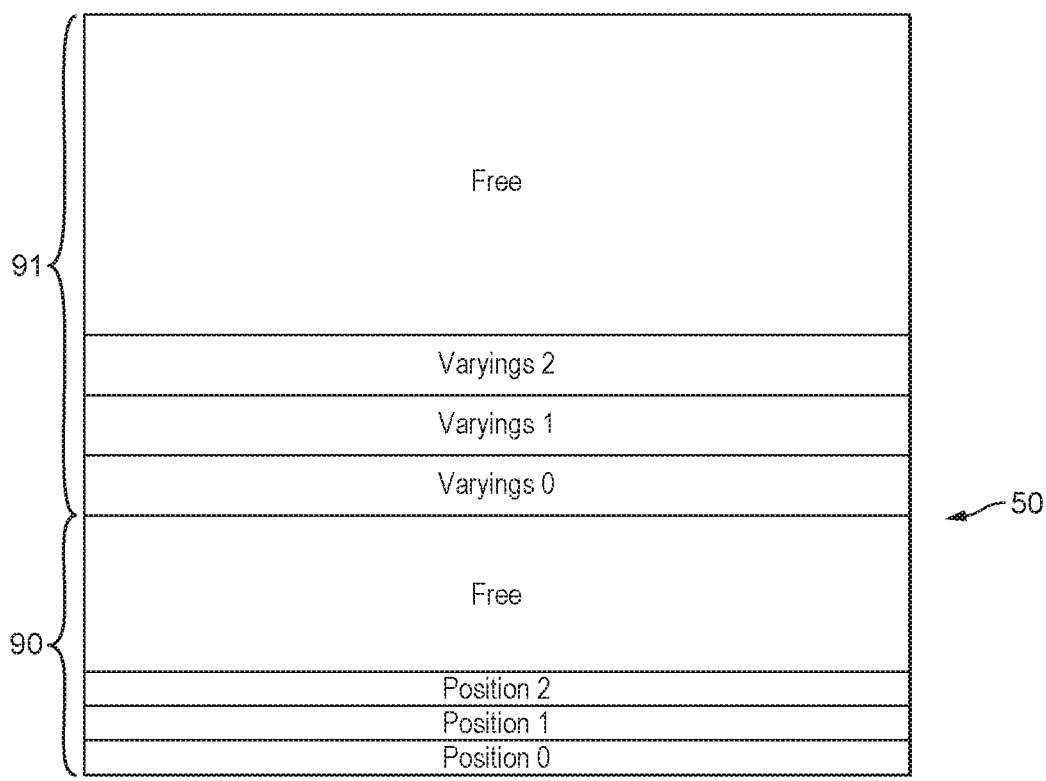

FIGS. 9 and 10 show the arrangement of vertex data within a vertex packet 50 in more detail. FIG. 9 shows a "full" vertex packet 50, and FIG. 10 shows a vertex packet 50 with free space in it (as it is being filled with vertex data).

As shown in FIGS. 9 and 10, each vertex packet 50 can store attributes data for n vertices, and consists of (and stores) n positions 90 starting at offset "0" in the vertex packet (one for each of the n vertices in the packet), and then n sets of non-position attributes (varyings) starting at a position (offset) a×n bytes into the block (packet) (i.e. starting at a position immediately after all the position data for all the n vertices has been stored) (where a is the number of bytes that the position attributes for a vertex will take up).

In the present embodiment, it is assumed that each cache line is 64-bytes and each vertex has 4×FP32 coordinates. Accordingly n is set to 64 so as to ensure that a vertex packet will always be an integer number of cache lines and a is set to 16.

In this arrangement, the assigned internal vertex ID (sequence index) for a vertex modulo 64 (i.e. internal vertex ID % 64) equaling 0 is then used as a test to indicate that a new vertex packet needs to be allocated.

In the present embodiment, in order to access the vertex data in the vertex packets, the following addressing scheme is used:

Address=base address+floor(internal vertex ID/$n$)
*packet_size+(internal vertex ID % $n$)*attribute_stride+Attribute_offset.

The packet_size/attribute_stride/attribute_offset fields are configured statically by the driver, using a new "vertex packet attribute" descriptor. The internal vertex ID is the sequence index allocated to the vertex in question. n is the number of vertices that can be stored in a vertex packet (and so is 64 in the present embodiment), and the base address is the base address for the overall memory pool 15 where the vertex data is being stored (as discussed above).

Figure 3:
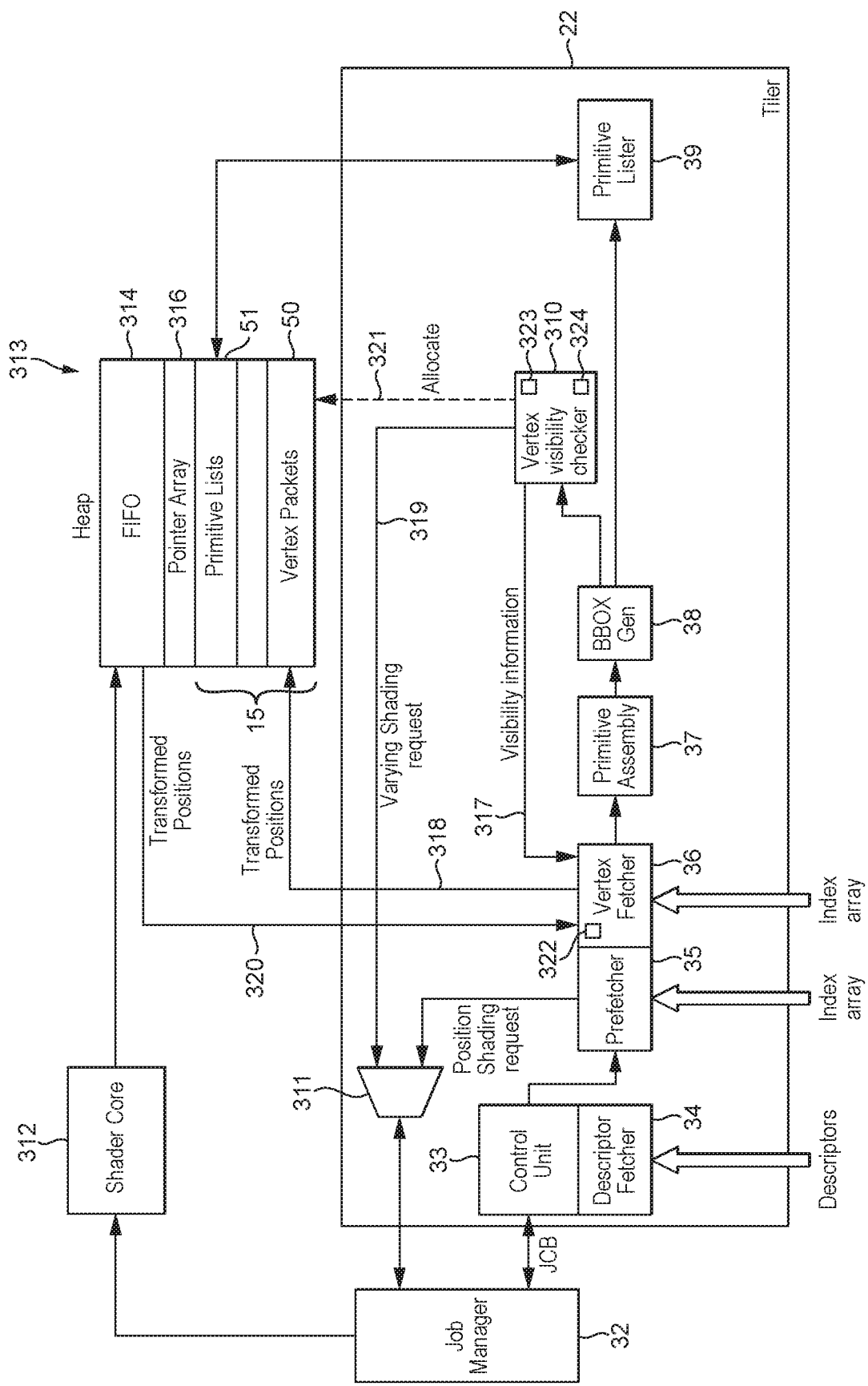
FIG. 3 schematically illustrates operation of the tiler stage of a graphics processing pipeline according to an embodiment of the technology described herein.

FIG. 3 schematically illustrates in more detail the operation of the tiler 22 of the graphics processing pipeline 20 in embodiments of the technology described herein.

FIG. 3 shows the tiler 22, a job manager 32, a shader core 312 and tiler heap 313 of the graphics processing pipeline 20. Located within the tiler heap 313 is a block of first-in first-out (FIFO) memory 314 which can be used to transfer vertex shaded position attributes data generated by the shader core 312 to the tiler 22, and a pool of memory 15 for storing primitive lists 51 output from the tiler 22 and vertex packets 50 for storing vertex data (as discussed above).

As discussed above, the memory pool 15 is provided as a memory address range allocated in main (system) memory.

The FIFO 314 is used as a temporary storage for position data sent from the shader core 312 to the tiler 22. It is provided as a memory range allocated in main (system) memory, but this is acceptable because due to the lifetime of the position data that will be being transferred to the tiler through the FIFO 314, it can be known that that data will be present in a cache (the L2 cache) at the time it is needed, and its memory location will then be reused for new positions before the data is evicted from the L2 cache.

(In particular, the tiler will request position shading, and the shader core will perform the position shading and write the resulting data to a given location in the FIFO 314. The tiler will then read that position data within a short period, and from that point the FIFO is available for a new set of positions from the shader core. This has the effect that the FIFO memory region is "kept warm" in the L2 cache and stays in the L2 cache until processing completes (the FIFO 314 will be evicted to main memory after processing completes, but this is acceptable as the footprint of the FIFO is much smaller than the amount of data that goes through it during its lifetime).)

The tiler 22 reads the position data from the FIFO 314 while, as discussed above, the position data is in the L2 cache, and then puts the position data into a vertex cache 322 until it has completed processing of the primitives using that position data.

In the present embodiments, this vertex cache 322 is located in the vertex fetcher 36, although other arrangements could be used if desired. The use and operation of the vertex cache is configured such that any shaded position data generated by the shader core 312 in response to a request from the tiler will only be evicted from the vertex cache after the tiler has completed its use of that data (and that data has, if appropriate, been written back to a vertex in a vertex packet 50 in the memory pool 15 in main memory).

Other arrangements would, of course, be possible.

To ensure that the necessary position data is available in the vertex cache 322 until any processing that needs that data by the tiler has been completed and the data has, if necessary, been written out to main memory, the need for the relevant position data entries in the cache is in an embodiment tracked. This is in an embodiment done using a reference counting scheme, where the "reference" count is incremented once for every instance of a given vertex, and decremented once each time processing of an instance has been completed. Other arrangements for ensuring that the data is present in the cache while that data might be needed would, of course, be possible.

As can be seen in FIG. 3, the tiler 22 comprises a control unit 33, descriptor fetcher 34, vertex prefetcher 35, vertex fetcher 36, primitive assembly stage 37, bounding box generator 38, primitive lister 39, vertex visibility checker unit 310 and interface unit 311.

A graphics processing job (task) (e.g. defining a set of draw calls/sub tasks to be processed for a frame or render pass) is received at the control unit 33 of the tiler 22 from the Job Manager 32 via the Job control Bus (JCB). The control unit 33 then instructs the descriptor fetcher 34 to read in the various descriptors needed by the tiler 22 for that graphics processing job. The descriptors provide the information needed by the tiler 22 for the graphics processing job in question, such as the shader program to run (to be executed), the configuration of attributes, stacks, etc., and any other information that is required to run (execute) the shader program.

Once the descriptors have been read in, the tiler 22 causes vertex-shaded position attributes data for the vertices defined for the job in question to be generated. To do this, the control unit 33 instructs the vertex prefetcher 35 to obtain position shaded attributes data for the vertices.

The vertex prefetcher 35 is configured to read in the index array (defining the set of vertices to be processed by the graphics processing pipeline), and determine whether or not vertex shading is required for the positional attributes of the vertices. The vertex prefetcher 35 is configured to do this by checking if vertex shaded position attributes data for the set of vertices will be available in the FIFO memory 314.

This operation is configured as follows. As shown in FIG. 3, both the vertex prefetcher 35 and vertex fetcher 36 read the index array defining the set of vertices to be processed (which index array defines the order that the vertices are used in). Since the vertex prefetcher 35 operates ahead of the vertex fetcher 36 and the vertex cache 322 is maintained by the vertex fetcher 36 (as discussed above), the operation of the vertex prefetcher 35 and the vertex fetcher 36 is configured such that the vertex prefetcher 35 will know which vertices will be in the vertex cache 322 at the time the vertex fetcher 36 reaches the same location in the index array (reaches the current location in the index array that the vertex prefetcher 35 has reached and is determining whether or not vertex shading is required for).

In the present embodiment, this is achieved by configuring the vertex cache to use a round robin replacement algorithm (which is therefore deterministic), such that the vertex prefetcher 35 can know when the vertex fetcher 36 will get cache hits and misses in the vertex cache (i.e. whether there will be vertex shaded position data for the vertex in question in the vertex cache or not). This then allows the vertex prefetcher 35 to, in effect, (correctly) predict the cache content.

The vertex prefetcher 35 accordingly operates to request position shading for every vertex (for every vertex position lookup) that it determines will "miss" in the vertex cache when the vertex fetcher 36 processes the index array. Since this prediction is exact in the present embodiment, the vertex prefetcher 35 can accordingly trigger position shading for vertices such that when a vertex cache lookup by the vertex fetcher 36 misses, the required position data will be the next entry in the FIFO 314.

If the vertex prefetcher 35 determines there will be a "miss" in the vertex cache 322 for a vertex or group of vertices, i.e. the determination reveals that vertex shaded position attributes data will not be stored in the vertex cache 322 for the vertex (or group of vertices) when the vertex fetcher 36 reaches the vertex or group of vertices in question, this is taken as an indication that vertex shading is required (with respect to the positional attributes) for that vertex (or group of vertices).

Accordingly, the vertex prefetcher 35 will trigger the vertex shading operation to generate vertex shaded position attributes data for all vertices that correspond to the cache miss. This is done by the prefetcher 35 sending a position shading request for a vertex (or group of vertices) to the Job Manager 32 via the interface 311. The job manager 32 instructs an available shader core 312 to perform the relevant vertex shading operation.

The position shading request contains an indication that it is a "position shading request" and information including job ID, index ID, instance ID, request ID and base address. The job ID is used to identify the descriptors related to the job. The index ID and instance ID is used to identify the vertex within that job. The base address and the request ID (offset from base address) defines the address in the memory 314 at which the output (shaded positions) from the shader core 312 should be stored. The address will define the next entry in the FIFO memory 314.

After the shader core 312 has generated the vertex shaded position data for a vertex (or group of vertices), the vertex shaded position data is stored in the next entry in the FIFO memory 314.

As discussed above, this will then have the effect that that vertex shaded position data will be the next entry in the FIFO 314 when the vertex fetcher 36 reaches the vertex (or group of vertices) in question in the index array (and so needs to load that vertex data into the vertex cache).

If the vertex prefetcher 35 determines there will be a "hit" in the vertex cache 322 for a vertex (or group of vertices), i.e. vertex shaded position attributes data will already be stored in the vertex cache 322 for the vertex (or group of vertices) when the vertex fetcher 36 reaches the vertex (or group of vertices) in question in the index array, then the position vertex shading operation is not required (and is not performed) for that vertex (or group of vertices).

As discussed above, the vertex fetcher 36 is operable to receive and process the index array concurrently with the prefetcher 35. Thus, the vertex fetcher 26 will process a vertex (or group of vertices) defined by the index array one-by-one with the prefetcher 35.

For a given vertex (or group of vertices) being processed by the vertex fetcher 36, the vertex fetcher 36 will attempt to fetch the vertex shaded attributes data from the vertex cache 322.

In the event of a cache "hit", it will fetch the data from vertex cache for the vertex (or group of vertices).

In the case of a cache "miss", the vertex fetcher 36 will retrieve 320 the vertex data from the FIFO memory 314 and load it into the vertex cache 322 appropriately. (As discussed above, the operation of the vertex prefetcher 35 and vertex fetcher 36 is synchronised such that the next entry in the FIFO 314 at this point will be the vertex shaded position attributes data for the vertex (or group of vertices) in question.) The vertex fetcher 36 can then fetch the data from the vertex cache 322.

The vertex fetcher 36 then sends the vertex shaded position attributes data for the vertices (together with the index array defining the primitives to be processed) to the primitive assembly unit 37, where the primitives are built for further processing.

After the primitives have been built in the primitive assembly unit 37, the primitives are sent to the bounding box generator unit 38.

The bounding box generator unit 38 is operable to determine the visibility of the primitives and store a "visibility flag" in association with each primitive. This is done by generating, for each primitive, a bounding box covering the primitive in question. Each bounding box is then tested by, for example, performing backface culling, frustum and viewport culling, scissoring, and/or sample aware tiling tests on the bounding boxes.

After a primitive is processed at the bounding box generator 38, it is passed to the vertex visibility checker 310.

The vertex visibility checker 310 maintains a record 324 of the vertices that have previously been allocated memory space 50 for their attributes in the memory space pool (heap) 15. This record also accordingly indicates whether the remaining (non-position) varyings of a vertex associated with an entry in the record have previously been subjected to the varying shading operation.

In the present embodiment, the record 324 indicating vertices and/or groups of vertices for which memory space has been allocated for vertex shaded attribute data comprises information indicating which memory space (the location of the memory space) that has been allocated to the vertex or group of vertices (which, if present, accordingly also provides an indication that memory space has been allocated to the vertex or group of vertices).

This record (information) indicating vertices and/or groups of vertices for which memory space has been allocated is stored in a cache, which contains a mapping from the input vertex identity to the allocated output vertex identity (with a miss in the cache correspondingly indicating that memory space has not been allocated to the vertex or group of vertices in question).

As will be discussed further below, in the present embodiment, the allocated output vertex identity comprises an allocated internal vertex ID (sequence index) (which will indicate the location of the vertex data in memory, as the vertices are stored in a linear array).

When the vertex visibility checker 310 receives a primitive, it will check whether the primitive is flagged as visible. If the primitive is not visible, the primitive will be discarded from further processing. However, if the primitive is visible, the vertex visibility checker 310 will, for every vertex in the primitive, determine whether memory space should be allocated in the memory pool 15 for the vertex (and, if appropriate, allocate memory space to the vertex).

The allocation of memory space in the tiler heap 15 in the present embodiment is done as follows.

If the primitive is the first primitive to be deemed visible in the draw call being processed, memory space for vertices for the draw call is allocated by setting the current bottom allocation pointer 52 for the tiler heap 15 as the base address for the stored vertex data for the draw call (for the new vertex buffer). Memory is then allocated at increasing addresses from that base address as needed for vertex packets (and vertices) while processing the draw call.

The allocated base address is stored and/or otherwise handled such that it can be retrieved and used by other elements and components of the graphics processing pipeline when they need it (to identify the base address used for the vertex shaded attributes data).

In the present embodiment, the base address is made a property of the attribute shading context (with the, e.g. tiler, setting this as a graphics processor internal property), with the subsequent attribute addressing then using that property without needing to read any descriptor from memory (without going through memory). Other arrangements, such as writing the base address to an appropriate descriptor for the set of vertices being processed, such as the draw call descriptor or an attribute buffer descriptor, could be used, if desired.

Once the vertex buffer base address has been set (or if it has already been set (where the primitive is not the first "visible" primitive of the draw call)), each vertex in the primitive is then considered, and it is determined whether the vertex has already had memory space allocated to it in the tiler heap 15. (As if a vertex has already been used by a visible primitive, memory will already have been allocated for it, and so there is no need to allocate memory space for it again.)

This is done by the vertex visibility checker 310 checking the vertex record cache 324 to see if memory space in the memory space pool 15 has already been allocated to the vertex.

If the vertex visibility checker "misses" in the vertex record cache 324, that indicates that memory space has not been previously allocated to the vertex. The vertex visibility checker 310 will accordingly as shown in FIG. 3, allocate 321 memory space for the vertex in the memory space pool 15 (in a vertex packet 50 in the memory space pool 15). The vertex visibility checker 310 includes for this purpose a memory allocator 323 that is operable to allocate memory for vertices in the appropriate manner.

When it is determined that memory space should be allocated to a vertex, memory space is allocated to it by assigning an internal vertex ID, which is the vertex's position in the sequential index of vertices that have been allocated memory space, to the vertex. This internal vertex ID is then used to control the actual memory allocation (and encoded into the primitive list to identify the vertex).

The vertex visibility checker 310 will also allocate a new entry in the vertex record cache 324 to the vertex, tagged with the vertex ID for the vertex and storing the assigned internal vertex ID for the vertex (so as to indicate the memory space that has been allocated for that vertex).

If the vertex record cache indicates that memory space has not been previously allocated to a vertex, the vertex visibility checker 310 will also, as shown in FIG. 3, send a varying shading request 319 for that vertex to the job manager 32. (To avoid lots of partial writes and too many shading requests to the shader core, in the present embodiments the tiler requests shading (both position and varying) for groups of plural, e.g. four, vertices.)

The varying shading request 319 contains an indication that it is a "varying shading" request, the same information as the position shading request mentioned above, and the new internal vertex ID (sequence index) assigned to the vertex. (Thus, as part of this request, the vertex shader is given both the API-visible instance ID and vertex ID values to use for reading values provided by the application, and the newly assigned internal vertex ID (sequence index) to use for storing the outputs of the varying vertex shading in the tiler heap 15.)

When vertex shaded varying attributes data is generated, the data is written to the correct location in a vertex packet 50 in the memory pool 15 using the received internal vertex ID (sequence index) for the vertex, and the base address, packet_size, attribute_stride and attribute_offset (which can be retrieved from the appropriate descriptor(s), etc.), as discussed above.

The job manager 32 keeps track of outstanding varying shading requests to determine when all data needed for the fragment shading pass has been created.

In addition to the above, the vertex visibility checker 310 is also operable to notify 317 the vertex fetcher 36 about visible vertices, so that the vertex fetcher 36 will then store (write out) 318 the vertex shaded position data for the visible primitives from the vertex cache 322 to the appropriate (allocated) vertex packets 50 in the main (system) memory pool 15. The new internal vertex ID, etc., allocated to a vertex is used, together with the base address and vertex packet size, to calculate where in memory to store the (already vertex shaded) position attributes for the vertex (which will have been used by the tiler to test the visibility of the primitive in question).

After the vertex shaded position data for the visible primitives has been stored in system memory, the data can be evicted from the vertex cache 322.

When a primitive is marked as visible (by the visibility flag), the primitive is also sent to the primitive lister 39 and sorted into respective primitive lists for each tile that the render output has been divided into. The primitive lists are written in the memory pool 15, for use later on in the graphics processing pipeline (as discussed above). The memory 51 for each primitive list is allocated as fixed sized chunks from the pool 15 as needed. The vertices for the primitives are identified (encoded) in the primitive lists using new internal vertex IDs (sequence indexes) assigned to the vertices.

When the varying shading request has been sent from the vertex visibility checker 310, the vertex visibility checker 310 will pass the primitive to the next stage in the pipeline, such as a fragment shading stage (not shown). For synchronization purposes between tiler jobs and fragment jobs, the progress of the varying shading is tracked. This can be done, e.g., by either stalling completion of the tiler job until the tiler 22 has received responses for all requests or by tracking this in the job manager 32.

It can be seen from the above that the technology described herein, in its embodiments at least, provides a system that avoids any up-front memory allocation for vertex data by the driver and that will only allocate memory for the vertices that actually end up in the primitive lists. This will accordingly, inter alia, improve performance and reduce memory footprint.

This is achieved, in the embodiments of the technology described herein at least, by only allocating memory space for vertex data once it has been determined that the vertex should be processed for generating the render output (e.g. is potentially "visible").

The foregoing detailed description has been presented for the purposes of illustration and description. It is not intended to be exhaustive or to limit the technology to the precise form disclosed. Many modifications and variations are possible in light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processing pipeline, the method comprising:

for a set of vertices to be processed by the graphics processing pipeline:

a vertex shading stage of the graphics processing pipeline performing a first vertex shading operation on one or more vertices of the set of vertices, to generate vertex shaded attribute data for at least one vertex attribute of the one or more vertices of the set;

a testing stage of the graphics processing pipeline determining, for respective vertices or groups of vertices of the one or more vertices that have been subjected to the first vertex shading operation, whether or not memory space should be allocated for storing vertex shaded attribute data for at least one vertex attribute for the vertex or group of vertices, wherein the determining comprises using, at least in part, some or all of the vertex shaded attribute data generated by the first vertex shading operation;

the testing stage, in response to determining that memory space should be allocated for a vertex or group of vertices, sending a request for memory space to be allocated for the vertex or group of vertices; and in response to the request from the testing stage, a memory allocator allocating memory space for storing vertex shaded attribute data for the vertex or group of vertices for which the request has been sent;

wherein the allocation of memory space to vertices is performed by allocating a larger block of memory space that is sufficient to store vertex shaded attribute data for plural vertices, and then allocating space within that block to individual vertices;

and the method comprises:

storing vertex shaded attribute data for plural vertices in a block of memory space by storing the position attributes for the plural vertices together, one after another, at one end of the block, and storing the non-position attributes for each of the vertices together, one after another, separately therefrom.

2. The method of claim 1, wherein the at least one vertex attribute that is processed in the first vertex shading operation comprises one or more position attributes of the vertices.

3. The method of claim 1, wherein the testing stage of the graphics processing pipeline determines, for respective vertices or groups of vertices of the one or more vertices that have been subjected to the first vertex shading operation, whether or not memory space should be allocated for storing vertex shaded attribute data for at least one vertex attribute for the vertex or group of vertices by:

determining whether the vertices are to be used for primitives that could be visible in the output of the graphics processing operation being performed.

4. The method of claim 1, further comprising the testing stage:

determining from information indicating vertices and/or groups of vertices that have already been allocated memory space, whether a vertex or group of vertices has already been allocated memory space; and when it is determined from the information that the vertex or group of vertices has already been allocated memory space, then not allocating further memory space for the vertex or group of vertices;

but when it is not determined that the vertex or group of vertices has already been allocated memory space, allocating memory space for the vertex or group of vertices.

5. The method of claim 1, wherein:

the graphics processing pipeline is a tile-based graphics processing pipeline; and the memory space for vertex shaded attributes data for vertices is allocated from a pool of memory space that is to be used for storing both primitive lists and vertex shaded vertex attributes data.

6. The method of claim 5, wherein the primitive lists are allocated memory space and stored in the memory space pool from the top of the memory space pool and downward, and the vertices are allocated memory space and stored in the memory space pool from the bottom up.

7. The method of claim 1, further comprising assigning to a vertex that has been allocated memory space for storing its vertex shaded attributes data, a vertex index which corresponds to the number of the vertex in a sequence of vertices that have been allocated memory space for their vertex shaded attributes data, which assigned vertex sequence index is then used, at least in part, to determine the memory address at which vertex shaded attributes data for the vertex is stored.

8. The method of claim 7, wherein the graphics processing pipeline is a tile-based graphics processing pipeline that uses primitive lists, and the assigned vertex sequence indexes for the vertices are used to identify the vertices in the primitive lists.

9. The method of claim 1, further comprising:

the testing stage of the graphics processing pipeline determining, for respective vertices or groups of vertices of the one or more vertices that have been subjected to the first vertex shading operation, whether or not a second vertex shading operation to generate vertex shaded attribute data for at least one other vertex attribute of the plurality of vertex attributes of the one or more vertices of the set should be performed for the vertex or group of vertices, wherein the determining comprises using, at least in part, some or all of the vertex shaded attribute data generated by the first vertex shading operation;

the testing stage, in response to determining that a second vertex shading operation should be performed for a vertex or group of vertices, sending a request for a second vertex shading operation to be performed for the vertex or group of vertices; and in response to the request from the testing stage, a vertex shading stage of the graphics processing pipeline performing a second vertex shading operation on the vertex or group of vertices for which the request has been sent, to generate vertex shaded attribute data for the at least one other vertex attribute of the plurality of vertex attributes of the one or more vertices of the set.

10. The method of claim 1, wherein the graphics processing pipeline is a tile based graphics processing pipeline, and the tiling stage of the graphics processing pipeline operates as the testing stage.

11. A graphics processing system, comprising:

graphics processing pipeline comprising:

a vertex shading circuit operable to perform a first vertex shading operation on one or more vertices of a set of vertices to be processed by the graphics processing pipeline, to generate vertex shaded attribute data for at least one vertex attribute of the one or more vertices of the set; and a testing circuit operable to determine, for respective vertices or groups of vertices of the one or more vertices that have been subjected to the first vertex shading operation, whether or not memory space should be allocated for storing vertex shaded attribute data for at least one vertex attribute for the vertex or group of vertices, wherein the determining comprises using, at least in part, some or all of the vertex shaded attribute data generated by the first vertex shading operation;

the testing circuit being further operable to, in response to determining that memory space should be allocated for a vertex or group of vertices, send a request for memory space to be allocated for the vertex or group of vertices;

the graphics processing system further comprising:

a memory allocator operable to, in response to a request from the testing circuit for memory space to be allocated, allocate memory space for storing vertex shaded attribute data for a vertex or group of vertices for which the request has been sent;

wherein:

the allocation of memory space to vertices is performed by allocating a larger block of memory space that is sufficient to store vertex shaded attribute data for plural vertices, and then allocating space within that block to individual vertices; and vertex shaded attribute data for plural vertices is stored in a block of memory space by storing the position attributes for the plural vertices together, one after another, at one end of the block, and storing the non-position attributes for each of the vertices together, one after another, separately therefrom.

12. The pipeline of claim 11, wherein the at least one vertex attribute that is processed in the first vertex shading operation comprises one or more position attributes of the vertices.

13. The pipeline of claim 11, wherein the testing circuit of the graphics processing pipeline determines, for respective vertices or groups of vertices of the one or more vertices that have been subjected to the first vertex shading operation, whether or not memory space should be allocated for storing vertex shaded attribute data for at least one vertex attribute for the vertex or group of vertices by:

determining whether the vertices are to be used for primitives that could be visible in the output of the graphics processing operation being performed.

14. The pipeline of claim 11, wherein the testing circuit is further operable to:

determine from information indicating vertices and/or groups of vertices that have already been allocated memory space, whether a vertex or group of vertices has already been allocated memory space; and when it is determined from the information that the vertex or group of vertices has already been allocated memory space, then not allocate further memory space for the vertex or group of vertices;

but when it is not determined that the vertex or group of vertices has already been allocated memory space, allocate memory space for the vertex or group of vertices.

15. The pipeline of claim 11, wherein:

the graphics processing pipeline is a tile-based graphics processing pipeline; and the memory space for vertex shaded attributes data for vertices is allocated from a pool of memory space that is to be used for storing both primitive lists and vertex shaded vertex attributes data.

16. The pipeline of claim 15, wherein the primitive lists are allocated memory space and stored in the memory space pool from the top of the memory space pool and downward, and the vertices are allocated memory space and stored in the memory space pool from the bottom up.

17. The pipeline of claim 11, wherein the testing circuit is further operable to assign to a vertex that has been allocated memory space for storing its vertex shaded attributes data, a vertex index which corresponds to the number of the vertex in a sequence of vertices that have been allocated memory space for their vertex shaded attributes data, which assigned vertex sequence index is then used, at least in part, to determine the memory address at which vertex shaded attributes data for the vertex is stored.

18. The pipeline of claim 17, wherein the graphics processing pipeline is a tile-based graphics processing pipeline that uses primitive lists, and the assigned vertex sequence indexes for the vertices are used to identify the vertices in the primitive lists.

19. The pipeline of claim 11, wherein the testing circuit is further operable to:

determine, for respective vertices or groups of vertices of the one or more vertices that have been subjected to the first vertex shading operation, whether or not a second vertex shading operation to generate vertex shaded attribute data for at least one other vertex attribute of the plurality of vertex attributes of the one or more vertices of the set should be performed for the vertex or group of vertices, wherein the determining comprises using, at least in part, some or all of the vertex shaded attribute data generated by the first vertex shading operation;

and to:

in response to determining that a second vertex shading operation should be performed for a vertex or group of vertices, send a request for a second vertex shading operation to be performed for the vertex or group of vertices;

and the graphics processing pipeline is further configured to, in response to the request from the testing_circuit:

perform a second vertex shading operation for the vertex or group of vertices for which the request has been sent, to generate vertex shaded attribute data for the at least one other vertex attribute of the plurality of vertex attributes of the one or more vertices of the set.

20. The pipeline of claim 11, wherein the graphics processing pipeline is a tile based graphics processing pipeline, and the tiling circuit of the graphics processing pipeline operates as the testing circuit.

21. A non-transitory computer readable storage medium storing computer software code which when executing on a processor performs a method of operating a graphics processing pipeline, the method comprising:

for a set of vertices to be processed by the graphics processing pipeline:

a vertex shading stage of the graphics processing pipeline performing a first vertex shading operation on one or more vertices of the set of vertices, to generate vertex shaded attribute data for at least one vertex attribute of the one or more vertices of the set;

a testing stage of the graphics processing pipeline determining, for respective vertices or groups of vertices of the one or more vertices that have been subjected to the first vertex shading operation, whether or not memory space should be allocated for storing vertex shaded attribute data for at least one vertex attribute for the vertex or group of vertices, wherein the determining comprises using, at least in part, some or all of the vertex shaded attribute data generated by the first vertex shading operation;

the testing stage, in response to determining that memory space should be allocated for a vertex or group of vertices, sending a request for memory space to be allocated for the vertex or group of vertices; and in response to the request from the testing stage, a memory allocator allocating memory space for storing vertex shaded attribute data for the vertex or group of vertices for which the request has been sent;

wherein the allocation of memory space to vertices is performed by allocating a larger block of memory space that is sufficient to store vertex shaded attribute data for plural vertices, and then allocating space within that block to individual vertices;

and the method comprises:

storing vertex shaded attribute data for plural vertices in a block of memory space by storing the position attributes for the plural vertices together, one after another, at one end of the block, and storing the non-position attributes for each of the vertices together, one after another, separately therefrom.

* * * * *